(12) United States Patent
Wei

(10) Patent No.: US 10,802,324 B2
(45) Date of Patent: Oct. 13, 2020

(54) DOUBLE VISION DISPLAY METHOD AND DEVICE

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 35 days.

(21) Appl. No.: 16/096,664

(22) PCT Filed: Feb. 9, 2018

(86) PCT No.: PCT/CN2018/076035
§ 371 (c)(1),
(2) Date: Oct. 25, 2018

(87) PCT Pub. No.: WO2018/166313
PCT Pub. Date: Sep. 20, 2018

(65) Prior Publication Data
US 2019/0137813 A1 May 9, 2019

(30) Foreign Application Priority Data
Mar. 14, 2017 (CN) .......................... 2017 1 0150195

(51) Int. Cl.
G02F 1/1335 (2006.01)
G09G 3/36 (2006.01)
(Continued)

(52) U.S. Cl.
CPC .. *G02F 1/133512* (2013.01); *G02F 1/133528* (2013.01); *G09G 3/003* (2013.01);
(Continued)

(58) Field of Classification Search
CPC ......... G02F 1/133512; G02F 1/133528; G02F 1/1347; H04N 13/31; H04N 13/305;
(Continued)

(56) References Cited

U.S. PATENT DOCUMENTS 5,963,371 A  10/1999 Needham et al.
2009/0103177 A1* 4/2009 Jang ..................... H04N 13/398
                                          359/462
(Continued)

FOREIGN PATENT DOCUMENTS

CN  101420629 A  4/2009
CN  101551984 A  10/2009
(Continued)

OTHER PUBLICATIONS

First Chinese Office Action dated Feb. 1, 2018, received for corresponding Chinese Application No. 201710150195.1.
(Continued)

*Primary Examiner* — Ibrahim A Khan
(74) *Attorney, Agent, or Firm* — Kinney & Lange, P.A.

(57) ABSTRACT

In one embodiment, a double vision display method includes: constructing a first image signal and a second image signal for a combination of image frames that includes a first raw image frame and a second raw image frame; alternately inputting the first image signal and the second image signal for each combination of image frames to a display panel; switching, when the first image signal is inputted to the display panel, a light transmission position of a liquid crystal grating according to the first image signal, to form a corresponding first double vision grating state; and switching, when the second image signal is inputted to the display panel, the light transmission position of the liquid crystal grating according to the second image signal, to form a corresponding second double vision grating state.

19 Claims, 9 Drawing Sheets

(51) Int. Cl.
*H04N 13/31* (2018.01)
*G09G 3/00* (2006.01)
*G09G 5/14* (2006.01)

(52) U.S. Cl.
CPC .......... *G09G 3/3607* (2013.01); *H04N 13/31* (2018.05); *G09G 3/36* (2013.01); *G09G 5/14* (2013.01); *G09G 2300/023* (2013.01); *G09G 2300/0439* (2013.01); *G09G 2320/068* (2013.01)

(58) Field of Classification Search
CPC ........ G09G 3/003; G09G 3/3607; G09G 3/36; G09G 2300/023; G09G 2320/068; G09G 5/14; G09G 2300/0439
See application file for complete search history.

(56) References Cited

U.S. PATENT DOCUMENTS

| | | | |
|---|---|---|---|
| 2011/0001894 A1* | 1/2011 | Owaku | G02F 1/1347 349/15 |
| 2011/0149218 A1 | 6/2011 | Nakayama | |
| 2011/0157167 A1 | 6/2011 | Bennett et al. | |
| 2011/0157168 A1 | 6/2011 | Bennett et al. | |
| 2011/0157169 A1 | 6/2011 | Bennett et al. | |
| 2011/0157170 A1 | 6/2011 | Bennett et al. | |
| 2011/0157171 A1* | 6/2011 | Lin | H04N 13/315 345/419 |
| 2011/0157257 A1 | 6/2011 | Bennett et al. | |
| 2011/0157267 A1 | 6/2011 | Seshadri et al. | |
| 2011/0157309 A1 | 6/2011 | Bennett et al. | |
| 2011/0157315 A1 | 6/2011 | Bennett et al. | |
| 2011/0157322 A1 | 6/2011 | Bennett et al. | |
| 2011/0157326 A1 | 6/2011 | Karaoguz et al. | |
| 2011/0157327 A1 | 6/2011 | Seshadri et al. | |
| 2011/0157330 A1 | 6/2011 | Bennett et al. | |
| 2011/0157336 A1 | 6/2011 | Bennett et al. | |
| 2011/0157339 A1 | 6/2011 | Bennett et al. | |
| 2011/0157471 A1 | 6/2011 | Seshadri et al. | |
| 2011/0157696 A1 | 6/2011 | Bennett et al. | |
| 2011/0157697 A1 | 6/2011 | Bennett et al. | |
| 2011/0161843 A1 | 6/2011 | Bennett et al. | |
| 2011/0164037 A1 | 7/2011 | Bennett et al. | |
| 2011/0164111 A1 | 7/2011 | Karaoguz et al. | |
| 2011/0164115 A1 | 7/2011 | Bennett et al. | |
| 2011/0169913 A1 | 7/2011 | Karaoguz et al. | |
| 2011/0169930 A1 | 7/2011 | Bennett et al. | |
| 2011/0170026 A1* | 7/2011 | Lin | H04N 13/315 349/15 |
| 2011/0222017 A1* | 9/2011 | Lin | H04N 13/317 349/201 |
| 2011/0234929 A1* | 9/2011 | Lin | H04N 13/356 349/15 |
| 2013/0148070 A1* | 6/2013 | Kim | H04N 13/376 349/143 |
| 2013/0153117 A1* | 6/2013 | Kobayashi | G02F 1/133512 156/67 |
| 2013/0155037 A1 | 6/2013 | Nakayama et al. | |
| 2014/0063383 A1* | 3/2014 | Xie | G02B 30/34 349/15 |
| 2014/0132711 A1* | 5/2014 | Brown Elliott | H04N 13/315 348/43 |
| 2014/0132744 A1 | 5/2014 | Wu et al. | |
| 2014/0192172 A1* | 7/2014 | Kang | G02F 1/13306 348/55 |
| 2014/0362314 A1* | 12/2014 | Guo | G02B 30/27 349/15 |
| 2015/0015668 A1 | 1/2015 | Bennett et al. | |
| 2015/0156473 A1 | 6/2015 | Bennett et al. | |
| 2015/0264341 A1 | 9/2015 | Seshadri et al. | |
| 2016/0011428 A1* | 1/2016 | Li | G02B 30/27 359/275 |
| 2016/0037084 A1 | 2/2016 | Wu et al. | |
| 2018/0239454 A1 | 8/2018 | Wu et al. | |

FOREIGN PATENT DOCUMENTS

| | | |
|---|---|---|
| CN | 101750748 A | 6/2010 |
| CN | 102183841 A | 9/2011 |
| CN | 102547310 A | 7/2012 |
| CN | 202306062 U | 7/2012 |
| CN | 102841447 A | 12/2012 |
| CN | 103163683 A | 6/2013 |
| CN | 103181174 A | 6/2013 |
| CN | 103635953 A | 3/2014 |
| CN | 103676286 A | 3/2014 |
| CN | 103747320 A | 4/2014 |
| CN | 104536219 A | 4/2015 |
| CN | 104683790 A | 6/2015 |
| CN | 205210485 U | 5/2016 |
| CN | 106066742 A | 11/2016 |
| CN | 106791797 A | 5/2017 |

OTHER PUBLICATIONS

Third Chinese Office Action dated Apr. 10, 2019, received for corresponding Chinese Application No. 201710150195.1.
International Search Report and English Translation of Box V of the Written Opinion dated May 2, 2018, received for corresponding Chinese Application No. PCT/CN2018/076035.

* cited by examiner

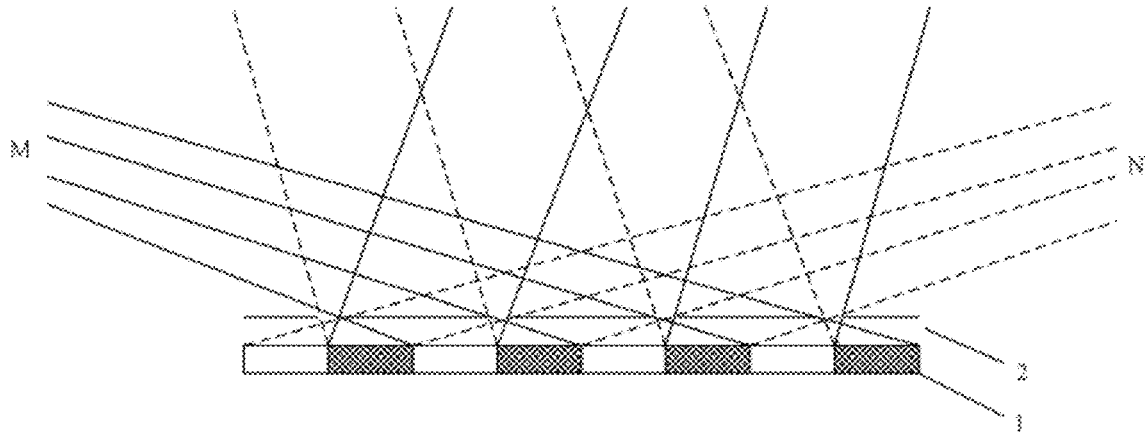

Fig. 1 constructing a first image signal and a second image signal for a combination of image frames that comprises a first raw image frame and a second raw image frame, wherein the first image signal comprises a signal for a first part of pixels of a first raw image and a signal for a second part of pixels of a second raw image, and the second image signal comprises a signal for a second part of pixels of the first raw image and a signal for a first part of pixels of the second raw image — 201 alternately inputting the first image signal and the second image signal for each combination of image frames to a display panel — 202 switching, when the first image signal is inputted to the display panel, a light transmission position of a liquid crystal grating according to the first image signal, to form a corresponding first double vision grating state such that the first part of pixels of the first raw image is displayed towards a first viewing area and the second part of pixels of the second raw image is displayed towards a second viewing area — 203 switching, when the second image signal is inputted to the display panel, the light transmission position of the liquid crystal grating according to the second image signal, to form a corresponding second double vision grating state such that the second part of pixels of the first raw image is displayed towards the first viewing area and the first part of pixels of the second raw image is displayed towards the second viewing area — 204

Fig. 2

```
┌─────────────────────────────────────────────────────────────────────┐
│ constructing a first image signal and a second image signal for a   │
│ combination of image frames that comprises a first raw image frame  │──301
│ and a second raw image frame, wherein the first image signal        │
│ comprises a signal for a first part of pixels of a first raw image  │
│ and a signal for a second part of pixels of a second raw image, and │
│ the second image signal comprises a signal for a second part of     │
│ pixels of the first raw image and a signal for a first part of      │
│ pixels of the second raw image                                      │
└─────────────────────────────────────────────────────────────────────┘
                                  │
┌─────────────────────────────────────────────────────────────────────┐
│ alternately inputting the first image signal and the second image   │──302
│ signal for each combination of image frames to a display panel      │
└─────────────────────────────────────────────────────────────────────┘
                                  │
┌─────────────────────────────────────────────────────────────────────┐
│ controlling, when the first image signal is inputted to the display │──303
│ panel, a voltage difference between the plate-shaped electrode and  │
│ each of the strip electrodes according to the first image signal    │
└─────────────────────────────────────────────────────────────────────┘
                                  │
┌─────────────────────────────────────────────────────────────────────┐
│ switching the light transmission position of the liquid crystal     │
│ grating according to the voltage difference controlled by the first │──304
│ image signal, to form the corresponding first double vision grating │
│ state such that the first part of pixels of the first raw image is  │
│ displayed towards the first viewing area and the second part of     │
│ pixels of the second raw image is displayed towards the second      │
│ viewing area                                                        │
└─────────────────────────────────────────────────────────────────────┘
                                  │
┌─────────────────────────────────────────────────────────────────────┐
│ controlling, when the second image signal is inputted to the        │──305
│ display panel, a voltage difference between the plate-shaped        │
│ electrode and each of the strip electrodes according to the second  │
│ image signal                                                        │
└─────────────────────────────────────────────────────────────────────┘
                                  │
┌─────────────────────────────────────────────────────────────────────┐
│ switching the light transmission position of the liquid crystal     │
│ grating according to the voltage difference controlled by the       │──306
│ second image signal, to form the corresponding second double vision │
│ grating state such that the second part of pixels of the first raw  │
│ image is displayed towards the first viewing area and the first     │
│ part of pixels of the second raw image is displayed towards the     │
│ second viewing area                                                 │
└─────────────────────────────────────────────────────────────────────┘
```

Fig. 3

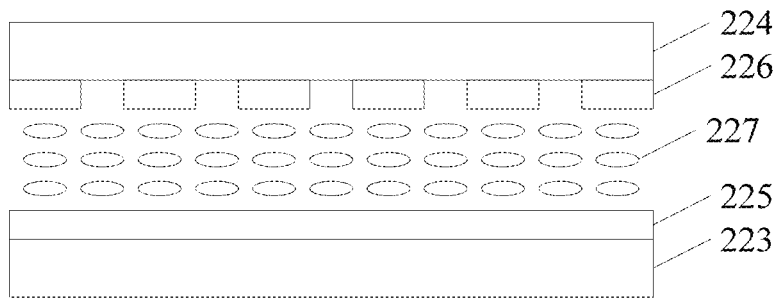

Fig. 3a

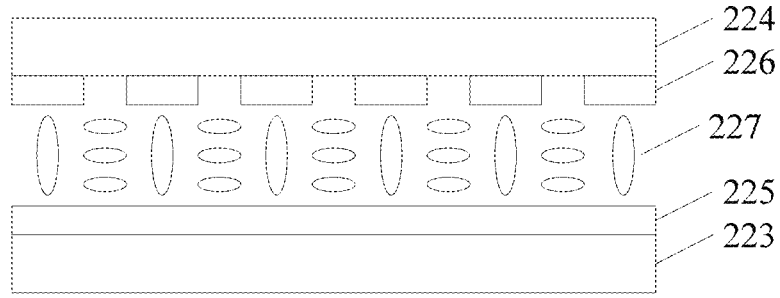

Fig. 3b constructing a first image signal and a second image signal for a combination of image frames that comprises a first raw image frame and a second raw image frame, wherein the first image signal comprises a signal for a first part of pixels of a first raw image and a signal for a second part of pixels of a second raw image, and the second image signal comprises a signal for a second part of pixels of the first raw image and a signal for a first part of pixels of the second raw image ⸺ 401 alternately inputting the first image signal and the second image signal for each combination of image frames to a display panel ⸺ 402 controlling, when the first image signal is inputted to the display panel, a voltage difference between each of the strip electrodes on the first sub-substrate or the second sub-substrate and the plate-shaped electrode according to the first image signal ⸺ 403 switching the light transmission position of the liquid crystal grating according to the voltage difference controlled by the first image signal, to form the corresponding first double vision grating state such that the first part of pixels of the first raw image is displayed towards the first viewing area and the second part of pixels of the second raw image is displayed towards the second viewing area ⸺ 404 controlling, when the second image signal is inputted to the display panel, a voltage difference between each of the strip electrodes on the second sub-substrate or the first sub-substrate and the plate-shaped electrode according to the second image signal ⸺ 405 switching the light transmission position of the liquid crystal grating according to the voltage difference controlled by the second image signal, to form the corresponding second double vision grating state such that the second part of pixels of the first raw image is displayed towards the first viewing area and the first part of pixels of the second raw image is displayed towards the second viewing area ⸺ 406

Fig. 4

DOUBLE VISION DISPLAY METHOD AND DEVICE

CROSS-REFERENCE TO RELATED APPLICATION

This application is a 371 National Stage application of International Application No. PCT/CN2018/076035, filed on Feb. 9, 2018, which has not yet published, and which claims priority to Chinese Patent Application No. 201710150195.1 filed on Mar. 14, 2017 in the State Intellectual Property Office of China, the disclosure of which is hereby incorporated by reference in its entirety.

TECHNICAL FIELD

The present disclosure relates to the field of display technology, and particularly, to double vision display method and device.

BACKGROUND

Double vision display technology is a technology of simultaneously displaying two displayed images on one display panel. Users can view different images at different angles of the display panel.

SUMMARY

According to an aspect of the present disclosure, there is provided a double vision display method, comprising:

constructing a first image signal and a second image signal for a combination of image frames that comprises a first raw image frame and a second raw image frame, wherein the first image signal comprises a signal for a first part of pixels of a first raw image and a signal for a second part of pixels of a second raw image, and the second image signal comprises a signal for a second part of pixels of the first raw image and a signal for a first part of pixels of the second raw image;

alternately inputting the first image signal and the second image signal for each combination of image frames to a display panel;

switching, when the first image signal is inputted to the display panel, a light transmission position of a liquid crystal grating according to the first image signal, to form a corresponding first double vision grating state such that the first part of pixels of the first raw image is displayed towards a first viewing area and the second part of pixels of the second raw image is displayed towards a second viewing area; and switching, when the second image signal is inputted to the display panel, the light transmission position of the liquid crystal grating according to the second image signal, to form a corresponding second double vision grating state such that the second part of pixels of the first raw image is displayed towards the first viewing area and the first part of pixels of the second raw image is displayed towards the second viewing area.

In one embodiment, the liquid crystal grating comprises a first substrate, a second substrate and a liquid crystal layer between the first substrate and the second substrate, a plate-shaped electrode is provided at a side of the first substrate facing the liquid crystal layer, and a plurality of strip electrodes are provided at a side of the second substrate facing the liquid crystal layer.

In one embodiment, the switching, when the first image signal is inputted to the display panel, a light transmission position of a liquid crystal grating according to the first image signal, to form a corresponding first double vision grating state such that the first part of pixels of the first raw image is displayed towards a first viewing area and the second part of pixels of the second raw image is displayed towards a second viewing area, comprises:

controlling, when the first image signal is inputted to the display panel, a voltage difference between the plate-shaped electrode and each of the strip electrodes according to the first image signal; and switching the light transmission position of the liquid crystal grating according to the voltage difference, to form the corresponding first double vision grating state such that the first part of pixels of the first raw image is displayed towards the first viewing area and the second part of pixels of the second raw image is displayed towards the second viewing area.

In one embodiment, the second substrate comprises a first sub-substrate and a second sub-substrate arranged as upper and lower layers, the first sub-substrate and the second sub-substrate comprise the plurality of strip electrodes arranged alternately, and the first sub-substrate and the second sub-substrate are insulated from each other.

In one embodiment, the switching, when the first image signal is inputted to the display panel, a light transmission position of a liquid crystal grating according to the first image signal, to form a corresponding first double vision grating state such that the first part of pixels of the first raw image is displayed towards a first viewing area and the second part of pixels of the second raw image is displayed towards a second viewing area, comprises:

controlling, when the first image signal is inputted to the display panel, a voltage difference between each of the strip electrodes on the first sub-substrate or the second sub-substrate and the plate-shaped electrode according to the first image signal; and switching the light transmission position of the liquid crystal grating according to the voltage difference, to form the corresponding first double vision grating state such that the first part of pixels of the first raw image is displayed towards the first viewing area and the second part of pixels of the second raw image is displayed towards the second viewing area.

In one embodiment, the first part of pixels of the first raw image comprises n adjacent columns of pixels in the first raw image; the second part of pixels of the first raw image comprises n columns of pixels adjacent to the first part of pixels in the first raw image; the first part of pixels of the second raw image comprises n adjacent columns of pixels in the second raw image, and column number of the first part of pixels of the second raw image is the same as that of the first part of pixels of the first raw image; the first part of pixels of the second raw image comprises n columns of pixels adjacent to the first part of pixels in the second raw image, and column number of the second part of pixels of the second raw image is the same as that of the second part of pixels of the first raw image; wherein n is a natural number equal to or greater than one.

In one embodiment, the first part of pixels of the first raw image comprises odd-numbered columns of pixels in the first raw image; the second part of pixels of the first raw image comprises even-numbered columns of pixels in the first raw image; the first part of pixels of the second raw image comprises odd-numbered columns of pixels in the second raw image; and the second part of pixels of the second raw image comprises even-numbered columns of pixels in the second raw image; and the liquid crystal grating comprises first grating elements that respectively locate between the odd-numbered columns of pixels and the even-numbered columns of pixels of the display panel and second grating elements that respectively locate between the even-numbered columns of pixels and the odd-numbered columns of pixels of the display panel.

In one embodiment, the switching a light transmission position of a liquid crystal grating according to the first image signal, to form a corresponding first double vision grating state, comprises:

controlling, according to the first image signal, the first grating elements to be light transmissive and the second grating elements to be opaque, to form the corresponding first double vision grating state.

In one embodiment, the switching the light transmission position of the liquid crystal grating according to the second image signal, to form a corresponding second double vision grating state, comprises:

controlling, according to the second image signal, the second grating elements to be light transmissive and the first grating elements to be opaque, to form the corresponding second double vision grating state.

In one embodiment, in the display panel, sub-pixel units of one color are only included in a same column when sub-pixel units of three different colors are arranged in a row direction, or sub-pixel units of one color are only included in a same row when sub-pixel units of three different colors are arranged in a column direction.

In one embodiment, in the display panel, the first and the second grating elements of the liquid crystal gratings have a same width, or the first grating elements of the liquid crystal gratings have a width different from the second grating elements of the liquid crystal gratings.

According to another aspect of the present disclosure, there is provided a double vision display device, comprising:

an image signal construction module, configured for constructing a first image signal and a second image signal for a combination of image frames that comprises a first raw image frame and a second raw image frame, wherein the first image signal comprises a signal for a first part of pixels of a first raw image and a signal for a second part of pixels of a second raw image, and the second image signal comprises a signal for a second part of pixels of the first raw image and a signal for a first part of pixels of the second raw image;

a signal input module, configured for alternately inputting the first image signal and the second image signal for each combination of image frames to a display panel;

a first double vision grating formation module, configured for switching, when the first image signal is inputted to the display panel, a light transmission position of a liquid crystal grating according to the first image signal, to form a corresponding first double vision grating state such that the first part of pixels of the first raw image is displayed towards a first viewing area and the second part of pixels of the second raw image is displayed towards a second viewing area; and a second double vision grating formation module, configured for switching, when the second image signal is inputted to the display panel, the light transmission position of the liquid crystal grating according to the second image signal, to form a corresponding second double vision grating state such that the second part of pixels of the first raw image is displayed towards the first viewing area and the first part of pixels of the second raw image is displayed towards the second viewing area.

In one embodiment, the liquid crystal grating comprises a first substrate, a second substrate and a liquid crystal layer between the first substrate and the second substrate, a plate-shaped electrode is provided at a side of the first substrate facing the liquid crystal layer, and a plurality of strip electrodes are provided at a side of the second substrate facing the liquid crystal layer;

the first double vision grating formation module comprises:

a first voltage difference control module configured for controlling, when the first image signal is inputted to the display panel, a voltage difference between the plate-shaped electrode and each of the strip electrodes according to the first image signal; and a first light transmission position switching module configured for switching the light transmission position of the liquid crystal grating according to the voltage difference controlled by the first voltage difference control module, to form the corresponding first double vision grating state such that the first part of pixels of the first raw image is displayed towards the first viewing area and the second part of pixels of the second raw image is displayed towards the second viewing area; and the second double vision grating formation module comprises:

a second voltage difference control module configured for controlling, when the second image signal is inputted to the display panel, a voltage difference between the plate-shaped electrode and each of the strip electrodes according to the second image signal; and a second light transmission position switching module configured for switching the light transmission position of the liquid crystal grating according to the voltage difference controlled by the second voltage difference control module, to form the corresponding second double vision grating state such that the second part of pixels of the first raw image is displayed towards the first viewing area and the first part of pixels of the second raw image is displayed towards the second viewing area.

In one embodiment, the liquid crystal grating comprises a first substrate, a second substrate and a liquid crystal layer between the first substrate and the second substrate, the second substrate comprises a first sub-substrate and a second sub-substrate arranged as upper and lower layers, the first sub-substrate and the second sub-substrate comprise the plurality of strip electrodes arranged alternately, and the first sub-substrate and the second sub-substrate are insulated from each other;

the first double vision grating formation module comprises:

a third voltage difference control module configured for controlling, when the first image signal is inputted to the display panel, a voltage difference between each of the strip electrodes on the first sub-substrate or the second sub-substrate and the plate-shaped electrode according to the first image signal; and a third light transmission position switching module configured for switching the light transmission position of the liquid crystal grating according to the voltage difference controlled by the third voltage difference control module, to form the corresponding first double vision grating state such that the first part of pixels of the first raw image is displayed towards the first viewing area and the second part of pixels of the second raw image is displayed towards the second viewing area; and the second double vision grating formation module comprises:

a fourth voltage difference control module configured for controlling, when the second image signal is inputted to the display panel, a voltage difference between each of the strip electrodes on the second sub-substrate or the first sub-substrate and the plate-shaped electrode according to the second image signal; and a fourth light transmission position switching module configured for switching the light transmission position of the liquid crystal grating according to the voltage difference controlled by the fourth voltage difference control module, to form the corresponding second double vision grating state such that the second part of pixels of the first raw image is displayed towards the first viewing area and the first part of pixels of the second raw image is displayed towards the second viewing area.

In one embodiment, the first part of pixels of the first raw image comprises n adjacent columns of pixels in the first raw image; the second part of pixels of the first raw image comprises n columns of pixels adjacent to the first part of pixels in the first raw image; the first part of pixels of the second raw image comprises n adjacent columns of pixels in the second raw image, and column number of the first part of pixels of the second raw image is the same as that of the first part of pixels of the first raw image; the first part of pixels of the second raw image comprises n columns of pixels adjacent to the first part of pixels in the second raw image, and column number of the second part of pixels of the second raw image is the same as that of the second part of pixels of the first raw image; wherein n is a natural number equal to or greater than one.

In one embodiment, the first part of pixels of the first raw image comprises odd-numbered columns of pixels in the first raw image; the second part of pixels of the first raw image comprises even-numbered columns of pixels in the first raw image; the first part of pixels of the second raw image comprises odd-numbered columns of pixels in the second raw image; the second part of pixels of the second raw image comprises even-numbered columns of pixels in the second raw image; and the liquid crystal grating comprises first grating elements that respectively locate between the odd-numbered columns of pixels and the even-numbered columns of pixels of the display panel and second grating elements that respectively locate between the even-numbered columns of pixels and the odd-numbered columns of pixels of the display panel.

In one embodiment, the first double vision grating formation module further comprises:

a first double vision grating formation sub-module, configured for controlling, according to the first image signal, the first grating elements to be light transmissive and the second grating elements to be opaque, to form the corresponding first double vision grating state; and the second double vision grating formation module further comprises:

a second double vision grating formation sub-module, configured for controlling, according to the second image signal, the second grating elements to be light transmissive and the first grating elements to be opaque, to form the corresponding second double vision grating state.

In one embodiment, in the display panel, sub-pixel units of one color are only included in a same column when sub-pixel units of three different colors are arranged in a row direction, or sub-pixel units of one color are only included in a same row when sub-pixel units of three different colors are arranged in a column direction.

In one embodiment, in the display panel, the first and the second grating elements of the liquid crystal gratings have a same width, or the first grating elements of the liquid crystal gratings have a width different from the second grating elements of the liquid crystal gratings.

BRIEF DESCRIPTION OF THE DRAWINGS

Various and other advantages and benefits will become apparent to those skilled in the art by reading the detailed description of the specific embodiments below. The attached drawings are only intended to illustrate the specific embodiments and are not to be considered as limiting the present disclosure. The same components are denoted by the same reference numerals throughout the attached drawings, in which FIG. 1 is a schematic view showing a structure for a double vision display in related art;

FIG. 2 shows a flow diagram of a double vision display method according to an embodiment of the present disclosure;

FIG. 3 shows a flow diagram of a double vision display method according to another embodiment of the present disclosure;

FIG. 3a is a schematic view showing a liquid crystal grating in a first state;

FIG. 3b is a schematic view showing the liquid crystal grating in a second state;

FIG. 4 shows a flow diagram of a double vision display method according to a yet another embodiment of the present disclosure;

DETAILED DESCRIPTION OF THE EMBODIMENTS

Figure 2A:
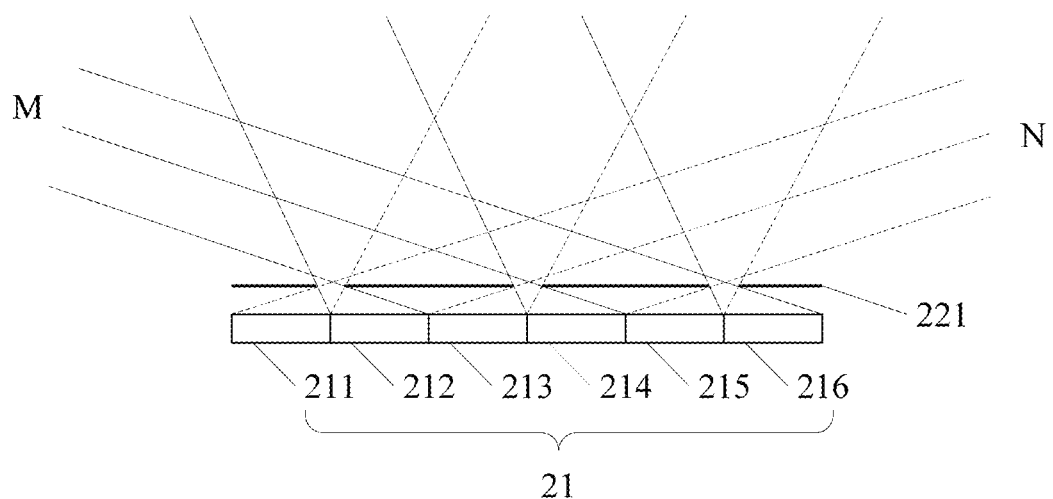
FIG. 2a is a schematic view showing a partial structure in which the liquid crystal grating is in a first double vision grating state.

Exemplary embodiments of the present disclosure will be described in more detail below with reference to the accompanying drawings. While the exemplary embodiments of the present disclosure are shown in the drawings, it should be understood that the present disclosure may be implemented in various forms and should not be limited by the embodiments set forth herein. Rather, these embodiments are provided so that the present disclosure will be more fully understood, and the scope of the present disclosure can be fully conveyed to those skilled in the art.

A parallax barrier method is a commonly used technique for implementing double vision display. Referring to FIG. 1, a schematic view of a double vision display in the related art is shown. As shown in FIG. 1, the structure for double vision display includes: a display panel 1 and a slit grating 2 located above the display panel 1. A user M on the left side only views a part of pixels on the display panel 1 through the slit grating 2, namely the pixels within the shaded portion shown in FIG. 1; a user N on the right side only views the other part of pixels on the display panel 1 through the slit grating 2, namely the pixels within the non-shaded portion shown in FIG. 1. As a result, a double vision display is achieved by inputting different image signals to the pixels viewed by the user M on the left side and those viewed by the user N on the right side, respectively.

The inventor has found that when using the foregoing technique, in the double vision display method of the foregoing technique, both the user on the left side and the user on the right side only view some of the pixels when an image is displayed, and the horizontal resolution is at least reduced to one half, which results in a reduced viewing clarity.

Referring to FIG. 2, a flow diagram of a double vision display method according to an embodiment of the present disclosure is shown. The method may specifically comprise the following steps.

A step 201 includes constructing a first image signal and a second image signal of a corresponding combination of image frames that comprises a first raw image frame and a second raw image frame; wherein the first image signal comprises a signal for a first part of pixels of a first raw image and a signal for a second part of pixels of a second raw image, and the second image signal comprises a signal for a second part of pixels of the first raw image and a signal for a first part of pixels of the second raw image.

According to the embodiments of the present disclosure, in a signal processing unit of the display device, a first frame of image in the first raw image and a corresponding first frame of image in the second raw image are combined to construct a first image signal and a second image signal of a first combination of image frames; correspondingly, a second frame of image in the first raw image and a corresponding second frame of image in the second raw image are combined to construct a first image signal and a second image signal of a second combination of image frames; and so on, until the last frame of image in the first raw image and the corresponding last frame of image in the second raw image are combined to construct a first image signal and a second image signal of the last combination of image frames. Therefore, the first image signal and the second image signal of the corresponding combination of image frames are constructed, and the combination of image frames includes the first raw image frame and the second raw image frame.

The signal for the first part of pixels of the first raw image and the signal for the second part of pixels of the second raw image are combined to form the first image signal; and the signal for the second part of pixels of the first raw image and the signal for the first part of pixels of the second raw image are combined to form the second image signal.

In one embodiment of the present disclosure, the first part of pixels of the first raw image comprises odd-numbered columns of pixels in the first raw image; the second part of pixels of the first raw image comprises even-numbered columns of pixels in the first raw image; the first part of pixels of the second raw image comprises odd-numbered columns of pixels in the second raw image; and the second part of pixels of the second raw image comprises even-numbered columns of pixels in the second raw image.

For example, it is assumed that both the first raw image and the second raw image have the pixels of 1920×1680, then, the first part of pixels of the first raw image comprises $1^{st}$, $3^{rd}$, $5^{th}$, $7^{th}$, ... up to $1919^{th}$ columns of pixels in the first raw image; the second part of pixels of the first raw image comprises $2^{nd}$, $4^{th}$, $6^{th}$, $8^{th}$, ... up to $1920^{th}$ columns of pixels in the first raw image; the first part of pixels of the second raw image comprises $1^{st}$, $3^{rd}$, $5^{th}$, $7^{th}$, ... up to $1919^{th}$ columns of pixels in the second raw image; and the second part of pixels of the second raw image comprises $2^{nd}$, $4^{th}$, $6^{th}$, $8^{th}$, ... up to $1920^{th}$ columns of pixels in the second raw image. The $1^{st}$, $3^{rd}$, $5^{th}$, $7^{th}$, and so on, columns of pixels in the first raw image and the $2^{nd}$, $4^{th}$, $6^{th}$, $8^{th}$, and so on, columns of pixels in the second raw image are combined to form the first image signal; and the $2^{nd}$, $4^{th}$, $6^{th}$, $8^{th}$, and so on, columns of pixels in the first raw image and the $1^{st}$, $3^{rd}$, $5^{th}$, $7^{th}$, and so on, columns of pixels in the second raw image are combined to form the second image signal.

In another embodiment of the present disclosure, the first part of pixels of the first raw image comprises two adjacent columns of pixels in the first raw image; the second part of pixels of the first raw image comprises two columns of pixels adjacent to the first part of pixels of the first raw image; the first part of pixels of the second raw image comprises two adjacent columns of pixels in the second raw image; and column number of the first part of pixels in the second raw image is the same as that of the first part of pixels of the first raw image; the second part of pixels of the second raw image comprises two columns of pixels adjacent to the first part of pixels in the second raw image; and column number of the second part of pixels of the second raw image is the same as that of the second part of pixels of the first raw image.

For example, the first part of pixels of the first raw image comprises $1^{st}$ and $2^{nd}$, or, $5^{th}$ and $6^{th}$, or, $9^{th}$ and $10^{th}$, and so on, columns of pixels in the first raw image; the second part of pixels of the first raw image comprises $3^{rd}$ and $4^{th}$, or, $7^{th}$ and $8^{th}$, or, $11^{th}$ and $12^{th}$, and so on, columns of pixels in the first raw image; the first part of pixels of the second raw image comprises $1^{st}$ and $2^{nd}$, or, $5^{th}$ and $6^{th}$, or, $9^{th}$ and $10^{th}$, and so on, columns of pixels in the second raw image; and the second part of pixels of the second raw image comprises $3^{rd}$ and $4^{th}$, or, $7^{th}$ and $8^{th}$, or, $11^{th}$ and $12^{th}$, and so on, columns of pixels in the second raw image.

In a yet another embodiment of the present disclosure, the first part of pixels of the first raw image may comprise three adjacent columns of pixels in the first raw image; the second part of pixels of the first raw image comprises three columns of pixels adjacent to the first part of pixels of the first raw image; the first part of pixels of the second raw image comprises three adjacent columns of pixels in the second raw image; and column number of the first part of pixels adjacent in the second raw image is the same as that of the first part of pixels of the first raw image; the second part of pixels of the second raw image comprises three columns of pixels adjacent to the first part of pixels in the second raw image; and column number of the second part of pixels of the second raw image is the same as that of the second part of pixels of the first raw image.

For example, the first part of pixels of the first raw image comprises $1^{st}$, $2^{nd}$ and $3^{rd}$, or, $7^{th}$, $8^{th}$ and $9^{th}$, or, $13^{rd}$, $14^{th}$ and $15^{th}$, and so on, columns of pixels in the first raw image;

the second part of pixels of the first raw image comprises $4^{th}$, $5^{th}$ and $6^{th}$, or, $10^{th}$, $11^{st}$ and $12^{nd}$, or, $16^{th}$, $17^{th}$ and $18^{th}$, and so on, columns of pixels in the first raw image; the first part of pixels of the second raw image comprises $1^{st}$, $2^{nd}$ and $3^{rd}$, or, $7^{th}$, $8^{th}$ and $9^{th}$, or, $13^{rd}$, $14^{th}$ and $15^{th}$, and so on, columns of pixels in the second raw image; and the second part of pixels of the second raw image comprises $4^{th}$, $5^{th}$ and $6^{th}$, or, $10^{th}$, $1^{st}$ and $12^{nd}$, or, $16^{th}$, $17^{th}$ and $18^{th}$, and so on, columns of pixels in the second raw image.

According to the embodiments of the present disclosure, the adjacent columns of pixels may further comprise four columns, five columns, and so on. The greater the number of adjacent columns is, the worse the viewing effect is. The specific number of columns is not limited in the embodiments of the present disclosure.

In step 202, the first image signal and the second image signal for each combination of image frames are alternately input to the display panel.

According to the embodiments of the present disclosure, firstly the first image signal and the second image signal of the first combination of image frames are input to the display panel. Specifically, the first image signal may be input at a first time, and the second image signal is input at a second time. Then, the first image signal and the second image signal of the second combination of image frames are input to the display panel. At last, the first image signal and the second image signal of the last second combination of image frames are input to the display panel.

For the first image signal and the second image signal for each combination of image frames, the first image signal and the second image signal are alternately input to the display panel. Firstly the first image signal of the first combination of image frames is input, and then the second image signal of the first combination of image frames is input. After that, the first image signal of the second combination of image frames is input, and then the second image signal of the second combination of image frames is input. In the above order, the first image signals and the second image signals are alternately input to the display panel, until the first image signal and the second image signal of the last combination of image frames are input to the display panel.

The display panel includes an LCD (Liquid Crystal Display) and an OLED (Organic Light-Emitting Diode). Since the OLED display panel has self-illuminating characteristics, no backlight source is required when using the OLED as a display panel of a display device.

In step 203 when the first image signal is inputted to the display panel, a light transmission position of a liquid crystal grating is switched according to the first image signal, to form a corresponding first double vision grating state such that the first part of pixels of the first raw image is displayed towards a first viewing area and the second part of pixels of the second raw image is displayed towards a second viewing area.

According to the embodiments of the present disclosure, at the first time, the first image signal is input to the display panel. According to the first image signal, the light transmission position of the liquid crystal grating is switched to form a corresponding first double vision grating state such that the first part of pixels of the first raw image is displayed towards a first viewing area and the second part of pixels of the second raw image is displayed towards a second viewing area; as a result, a user will view the first part of pixels of the first raw image when located within the first viewing area, and will view the second part of pixels of the second raw image when located within the second viewing area. The liquid crystal grating comprises first grating elements that respectively locate between the odd-numbered columns of pixels and the even-numbered columns of pixels of the display panel and second grating elements that respectively locate between the even-numbered columns of pixels and the odd-numbered columns of pixels of the display panel; that is to say, the first grating elements and the second grating elements of the liquid crystal grating are provided alternately.

When the first image signal includes a signal for odd-numbered columns of pixels in the first raw image and a signal for even-numbered columns of pixels in the second raw image, the first image signal is input to the display panel. According to the first image signal, first grating elements that respectively locate between the odd-numbered columns of pixels and the even-numbered columns of pixels of the display panel are controlled to be light transmissive, and correspondingly, second grating elements that respectively locate between the even-numbered columns of pixels and the odd-numbered columns of pixels of the display panel are controlled to be opaque, thereby forming the corresponding first double vision grating state.

Referring to FIG. 2a, a schematic view of a partial structure in which the liquid crystal grating is in a first double vision grating state is shown.

As shown in FIG. 2a, the display panel 21 comprises a sub-pixel unit 211, a sub-pixel unit 212, a sub-pixel unit 213, a sub-pixel unit 214, a sub-pixel unit 215 and a sub-pixel unit 216, and the liquid crystal grating (that is in a first double vision grating state) 221 is located above the display panel 21. The sub-pixel unit 211 may be a red sub-pixel unit, the sub-pixel unit 212 may be a green sub-pixel unit, the sub-pixel unit 213 may be a blue sub-pixel unit, the sub-pixel unit 214 may be a red sub-pixel unit, the sub-pixel unit 215 may be a green sub-pixel unit, and the sub-pixel unit 216 may be a blue sub-pixel unit. The colors of three adjacent sub-pixel units are different from one another, and specific color arrangement is not limited in the embodiments of the present disclosure.

When the first image signal includes a signal for odd-numbered columns of pixels in the first raw image and a signal for even-numbered columns of pixels in the second raw image, the first image signal is input to the display panel at a first time, such that sub-signals of the first image signal for the $1^{st}$, $2^{nd}$, $3^{rd}$, $4^{th}$, $5^{th}$, $6^{th}$ columns of pixels are respectively input to the sub-pixel unit 211, the sub-pixel unit 212, the sub-pixel unit 213, the sub-pixel unit 214, the sub-pixel unit 215 and the sub-pixel unit 216 of the display panel 21, the grating element of the liquid crystal grating extending from a position corresponding to the sub-pixel unit 211 to a position corresponding to the sub-pixel unit 212 is controlled to be light transmissive, the grating element of the liquid crystal grating extending from a position corresponding to the sub-pixel unit 213 to a position corresponding to the sub-pixel unit 214 is controlled to be light transmissive, the grating element of the liquid crystal grating extending from a position corresponding to the sub-pixel unit 215 to a position corresponding to the sub-pixel unit 216 is controlled to be light transmissive, the grating element of the liquid crystal grating extending from the position corresponding to the sub-pixel unit 212 to the position corresponding to the sub-pixel unit 213 is controlled to be opaque, and the grating element of the liquid crystal grating of the grating extending from the position corresponding to the sub-pixel unit 214 to the position corresponding to the sub-pixel unit 215 is controlled to be opaque, thereby forming the corresponding first double vision grating state.

In this case, a user N located within the first viewing area will view the $1_{st}$, $3^{rd}$, $5^{th}$ columns of pixels of the first image signal, that is, the $1^{st}$, $3^{rd}$, $5^{th}$ columns of pixels in the first raw image, while a user M located within the second viewing area will view the $2^{nd}$, $4^{th}$, $6^{th}$ columns of pixels of the first image signal, that is, the $2^{nd}$, $4^{th}$, $6^{th}$ columns of pixels in the second image signal.

According to the embodiments of the present disclosure, sub-pixel units of one color are only included in a same column when sub-pixel units of three different colors are arranged in a row direction, or sub-pixel units of one color are only included in a same row when sub-pixel units of three different colors are arranged in a column direction.

Figure 2B:
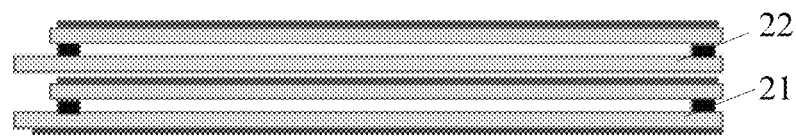
FIG. 2b is a schematic view showing structures of a display panel and a liquid crystal grating.

Referring to FIG. 2b, a schematic view of structures of a display panel and a liquid crystal grating is shown.

As shown in FIG. 2b, the display panel 21 is located below the liquid crystal grating 22, and refresh frequencies of the display panel and the liquid crystal grating are set to be greater than or equal to twice an original refresh frequency. When an image signal input to the display panel is changed, the light transmission position of the liquid crystal grating is switched accordingly. The display panel includes two glass substrates as upper and lower layers and a liquid crystal layer between the substrates. The liquid crystal grating includes a first substrate and a second substrate as upper and lower layers, and a liquid crystal layer between the first substrate and the second substrate.

For example, when the original refresh frequency is 60 Hz, the display panel and the liquid crystal grating have refresh frequencies greater than or equal to 120 Hz.

Figure 2C:
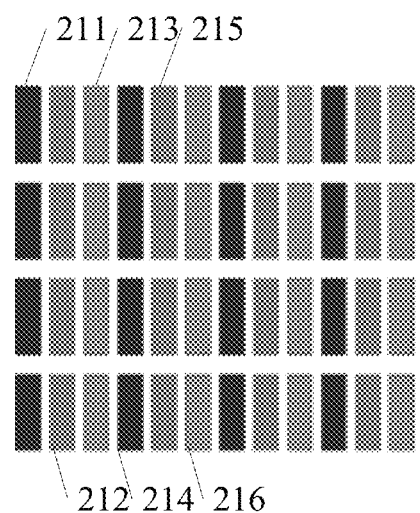
FIG. 2c is a schematic view showing a horizontal screen of a display panel.

Referring to FIG. 2c, a schematic view of a horizontal screen of the display panel is shown.

As shown in FIG. 2c, when the display panel stays as a horizontal screen, sub-pixel units of three different colors are arranged in a row direction, and sub-pixel units of one color are only included in a same column. The sub-pixel unit 211 may be a red sub-pixel unit, the sub-pixel unit 212 may be a green sub-pixel unit, the sub-pixel unit 213 may be a blue sub-pixel unit, the sub-pixel unit 214 may be a red sub-pixel unit, the sub-pixel unit 215 may be a green sub-pixel unit, and the sub-pixel unit 216 may be a blue sub-pixel unit. When the first image signal includes a signal for odd-numbered columns of pixels in the first raw image and a signal for even-numbered columns of pixels in the second raw image, the first image signal is input to the corresponding sub-pixel units at a first time, such that sub-signals of the first image signal for odd-numbered columns of pixels in the first raw image are respectively input to the sub-pixel units in odd-numbered columns, such as the sub-pixel unit 211, the sub-pixel unit 213 and the sub-pixel unit 215 as shown in FIG. 2c, of the display panel, and that sub-signals of the second image signal for even-numbered columns of pixels in the second raw image are respectively input to the sub-pixel units in even-numbered columns, such as the sub-pixel unit 212, the sub-pixel unit 214 and the sub-pixel unit 216 as shown in FIG. 2c.

Figure 2D:
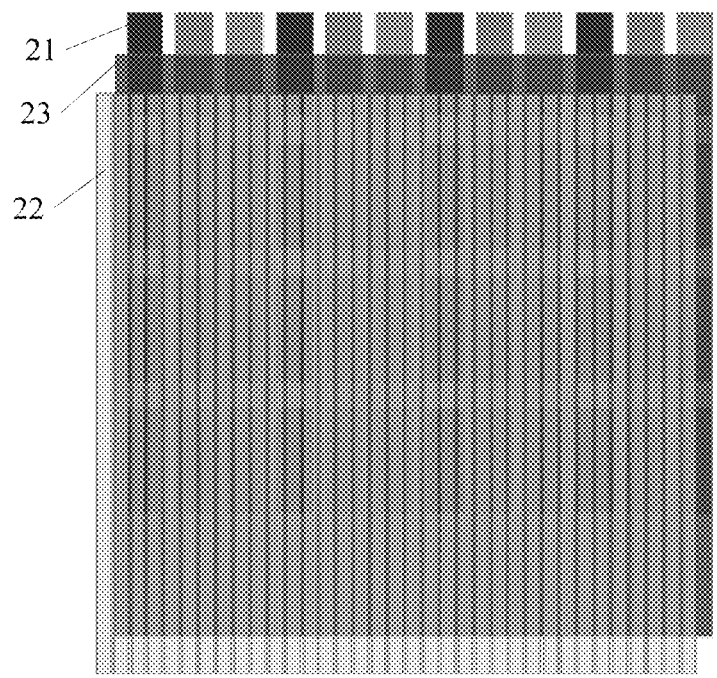
FIG. 2d is a schematic view showing a structure of a double vision display staying as a horizontal screen.

Referring to FIG. 2d, a schematic view of a structure of a double vision display staying as a horizontal screen is shown.

As shown in FIG. 2d, when the display panel 21 stays as a horizontal screen, sub-pixel units of three different colors are arranged in a row direction, and sub-pixel units of one color are only included in a same column. The liquid crystal grating 22 is located above the display panel 21, and provided between the display panel 21 and the liquid crystal grating 22 is a polarizer 23 for filtering light in different directions, leaving only light in a same direction. The grating elements of the liquid crystal gratings of the liquid crystal grating 22 have a same width.

Figure 2E:
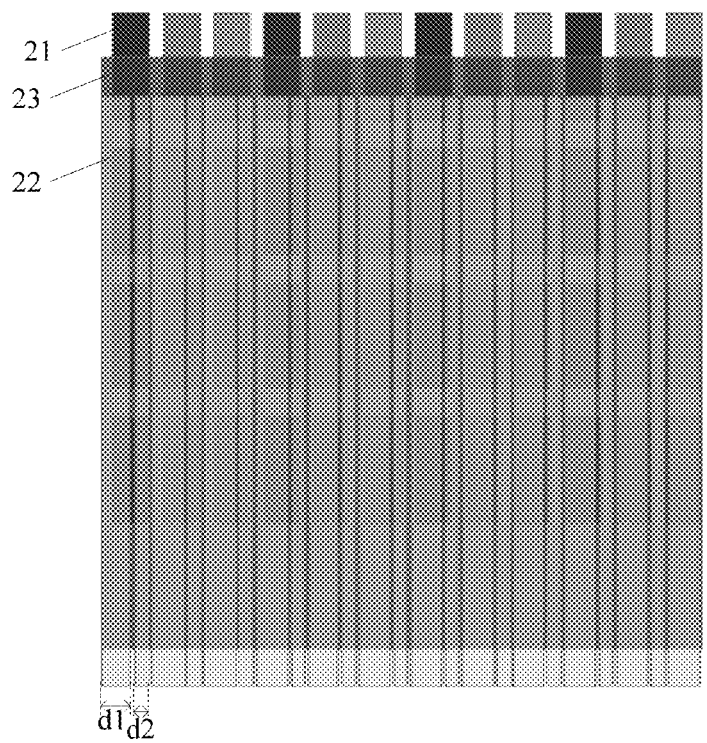
FIG. 2e is a schematic view showing another structure of a double vision display staying as a horizontal screen.

Referring to FIG. 2e, a schematic view of another structure of a double vision display staying as a horizontal screen is shown.

As shown in FIG. 2e, in the display panel 21, sub-pixel units of three different colors are arranged in a row direction, and sub-pixel units of one color are only included in a same column. The liquid crystal grating 22 is located above the display panel 21, and there is a polarizer 23 between the display panel 21 and the liquid crystal grating 22. Two adjacent grating elements of the liquid crystal gratings of the liquid crystal grating 22 have different widths, such that a width d1 of a wider one of the two adjacent grating elements of the liquid crystal gratings is greater than a width d2 of a narrower one of the two adjacent grating elements of the liquid crystal gratings. When the wider grating is light transmissive, the image is displayed in a high brightness, and the double vision display own a relatively small field of view, which is suitable for a small number of people. When the narrower grating is light transmissive, the double vision display own a relatively large field of view, and the image is displayed in a low brightness. In order to increase the brightness of the image displayed, it is required to increase the brightness of a backlight source, and the power consumption is correspondingly increased, which is suitable for a large number of people.

Figure 2F:
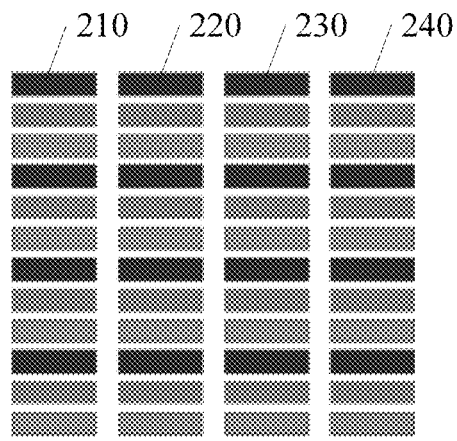
FIG. 2f is a schematic view showing a vertical screen of a display panel.

Referring to FIG. 2f, a schematic view of a vertical screen of the display panel is shown.

As shown in FIG. 2f, when the display panel stays as a vertical screen, sub-pixel units of three different colors are arranged in a column direction, and sub-pixel units of one color are only included in a same row. In the first row, the sub-pixel units 210, 220, 230, 240 are red sub-pixel units. When the first image signal includes signals for odd-numbered columns of pixels in the first raw image and signals for even-numbered columns of pixels in the second raw image, the first image signal is input to the corresponding sub-pixel unit at a first time, such that the signals for odd-numbered columns of pixels in the first raw image are respectively input to the sub-pixel units in odd-numbered column, such as the sub-pixel unit 210 and the sub-pixel unit 230 as shown in FIG. 2f, of the display panel, and the signals for even-numbered columns of pixels in the second raw image are respectively input to the sub-pixel units in even-numbered columns, such as the sub-pixel unit 220 and the sub-pixel unit 240 as shown in FIG. 2f, of the display panel.

Figure 2G:
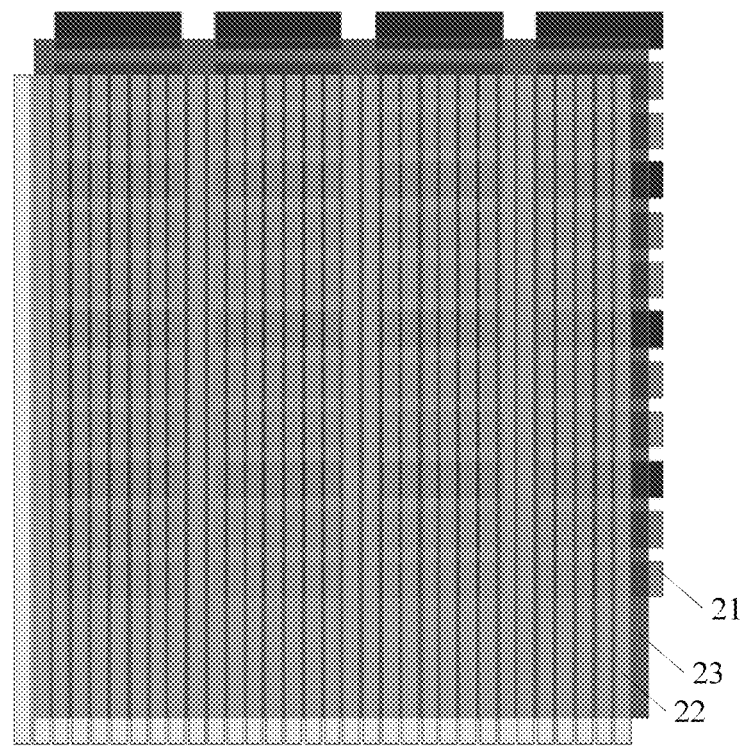
FIG. 2g is a schematic view showing a structure of a double vision display staying as a vertical screen.

Referring to FIG. 2g, a schematic view of a structure of a double vision display staying as a vertical screen is shown.

As shown in FIG. 2g, when the display panel 21 stays as a vertical screen, sub-pixel units of three different colors are arranged in a column direction, and sub-pixel units of one color are only included in a same row. The liquid crystal grating 22 is located above the display panel 21, and there is a polarizer 23 between the display panel 21 and the liquid crystal grating 22. The grating elements of the liquid crystal gratings of the liquid crystal grating 22 have a same width.

Figure 2H:
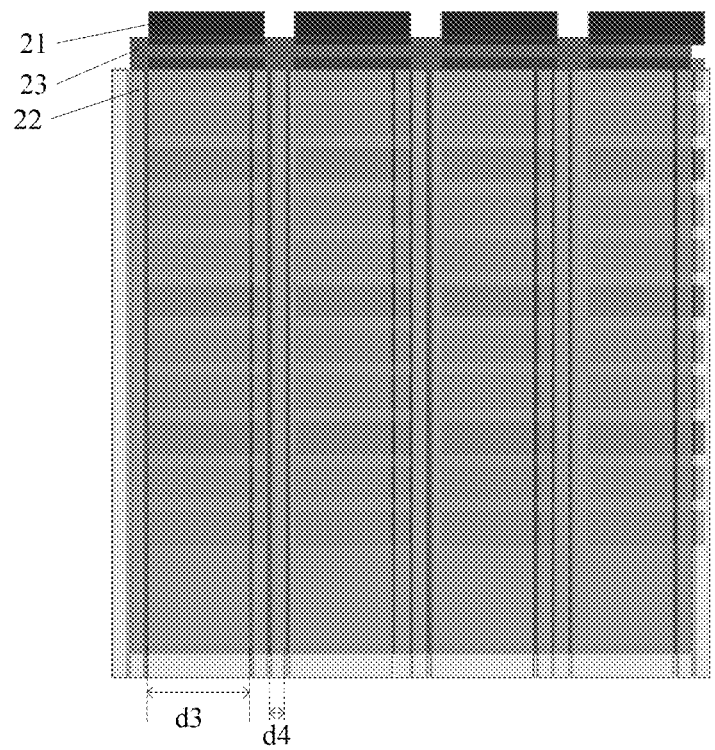
FIG. 2h is a schematic view showing another structure of a double vision display staying as a vertical screen.

Referring to FIG. 2h, a schematic view of another structure of a double vision display staying as a vertical screen is shown.

As shown in FIG. 2h, when the display panel 21 stays as a vertical screen, sub-pixel units of three different colors are arranged in a column direction, and sub-pixel units of one color are only included in a same row. The liquid crystal grating 22 is located above the display panel 21, and there is a polarizer 23 between the display panel 21 and the liquid crystal grating 22. This liquid crystal grating has the same structure as the liquid crystal grating shown in FIG. 2e. The width of one sub-pixel unit in a vertical screen is three times of the width of one sub-pixel unit in a horizontal screen when the display panel is converted from the horizontal screen to the vertical screen, so a light transmission width of the liquid crystal grating in the vertical screen is three times of a light transmission width of one sub-pixel unit in the horizontal screen. When the wider grating is light transmissive, the light transmission width d3 of the liquid crystal grating is three times of the light transmission width d1. When the narrower grating is light transmissive, the light transmission width d4 of the liquid crystal grating is three times of the light transmission width d2.

In step 204, when the second image signal is inputted to the display panel, the light transmission position of the liquid crystal grating is switched according to the second image signal, to form a corresponding second double vision grating state, such that the second part of pixels of the first raw image is displayed towards the first viewing area and the first part of pixels of the second raw image is displayed towards the second viewing area.

According to the embodiments of the present disclosure, the second image signal is input to the display panel at a second time. According to the second image signal, the light transmission position of the liquid crystal grating is switched to form a corresponding second double vision grating state such that the second part of pixels of the first raw image is displayed towards the first viewing area and the first part of pixels of the second raw image is displayed towards the second viewing area; as a result, a user will view the second part of pixels of the first raw image when located within the first viewing area, and will view the first part of pixels of the second raw image when located within the second viewing area.

When the second image signal includes a signal for even-numbered columns of pixels in the first raw image and a signal for odd-numbered columns of pixels in the second raw image, the second image signal is input to the display panel. According to the second image signal, the second grating elements that respectively locate between the even-numbered columns of pixels and the odd-numbered columns of pixels of the display panel is controlled to be light transmissive, and correspondingly, the first grating elements that respectively locate between the odd-numbered columns of pixels and the even-numbered columns of pixels of the display panel is controlled to be opaque, thereby forming the corresponding second double vision grating state.

Figure 2I:
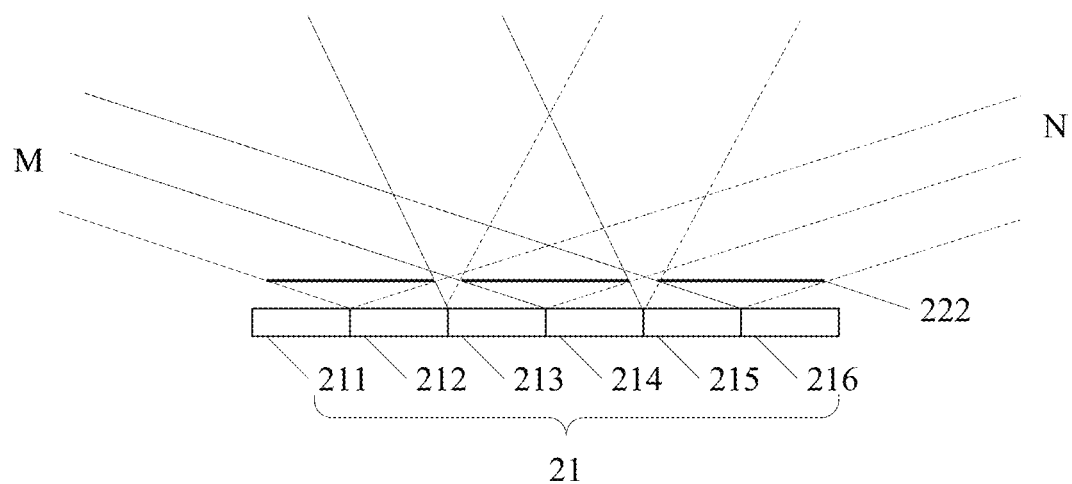
FIG. 2i is a schematic view showing a partial structure in which the liquid crystal grating is in a second double vision grating state.

Referring to FIG. 2i, a schematic view showing a partial structure in which the liquid crystal grating is in a second double vision grating state is shown.

As shown in FIG. 2i, the display panel 21 comprises a sub-pixel unit 211, a sub-pixel unit 212, a sub-pixel unit 213, a sub-pixel unit 214, a sub-pixel unit 215 and a sub-pixel unit 216, and the liquid crystal grating (that is in a second double vision grating state) 222 is located above the display panel 21. When the second image signal includes a signal for even-numbered columns of pixels in the first raw image and a signal for odd-numbered columns of pixels in the second raw image, the second image signal is input to the display panel at a second time. The signals for $1^{st}$, $2^{nd}$, $3^{rd}$, $4^{th}$, $5^{th}$, $6^{th}$ columns of pixels in the second image signal are respectively input to the sub-pixel unit 211, the sub-pixel unit 212, the sub-pixel unit 213, the sub-pixel unit 214, the sub-pixel unit 215 and the sub-pixel unit 216 of the display panel 21, a portion of the grating extending from a position corresponding to the sub-pixel unit 212 to a position corresponding to the sub-pixel unit 213 is controlled to be light transmissive, a portion of the grating extending from a position corresponding to the sub-pixel unit 214 to a position corresponding to the sub-pixel unit 215 is controlled to be light transmissive, a portion of the grating extending from a position corresponding to the sub-pixel unit 211 to a position corresponding to the sub-pixel unit 212 is controlled to be opaque, a portion of the grating extending from the a position corresponding to sub-pixel unit 213 to a position corresponding to the sub-pixel unit 214 is controlled to be opaque, and a portion of the grating extending from a position corresponding to the sub-pixel unit 215 to a position corresponding to the sub-pixel unit 216 is controlled to be opaque, thereby forming the corresponding second double vision grating state.

A user N located within the first viewing area will view the $2^{nd}$, $4^{th}$, $6^{th}$ columns of pixels columns of pixels of the second image signal, that is, the $2^{nd}$, $4^{th}$, $6^{th}$ columns of pixels in the first raw image, while a user M located within the second viewing area will view the $1^{st}$, $3^{rd}$, $5^{th}$ columns of pixels of the second image signal, that is, the $1^{st}$, $3^{rd}$, $5^{th}$ columns of pixels in the second raw image.

As shown in FIG. 2c, the display panel stays is in a state of horizontal screen; when the second image signal includes a signal for even-numbered columns of pixels in the first raw image and a signal for odd-numbered columns of pixels in the second raw image, the second image signal is input to the corresponding sub-pixel units at the second time, such that the signals for even-numbered columns of pixels in the first raw image are respectively input to the sub-pixel units in even-numbered columns, such as the sub-pixel unit 212, the sub-pixel unit 214 and the sub-pixel unit 216 as shown in FIG. 2c, of the display panel, and the signals for odd-numbered columns of pixels in the second raw image are respectively input to the sub-pixel units in odd-numbered columns, such as the sub-pixel unit 211, the sub-pixel unit 213 and the sub-pixel unit 215 as shown in FIG. 2c.

As shown in FIG. 2f, the display panel stays is in a state of vertical screen; when the second image signal includes a signal for even-numbered columns of pixels in the first raw image and a signal for odd-numbered columns of pixels in the second raw image, the second image signal is input to the corresponding sub-pixel units at the second time, such that the signals for even-numbered columns of pixels in the first raw image are respectively input to the sub-pixel units in even-numbered columns, such as the sub-pixel unit 220 and the sub-pixel unit 240 as shown in FIG. 2f, of the display panel, and the signals for odd-numbered columns of pixels in the second raw image are respectively input to the sub-pixel units in odd-numbered columns, such as the sub-pixel unit 210, the sub-pixel unit 230 as shown in FIG. 2f.

Thus it can be seen, refresh frequencies of the display panel and the liquid crystal grating are greater than or equal to twice the original refresh frequency. The refresh frequencies of the display panel and the liquid crystal grating are increased by changing liquid crystal molecules of the display panel and the liquid crystal, and by increasing the power supply frequencies of the display panel and the liquid crystal grating; the first image signal and the second image signal are inputted to the display panel at the first time and the second time respectively, so that a user located within the first viewing area will view the first part of pixels of the first raw image at the first time, and will view the second part of pixels of the first raw image at the second time; similarly, a user located within the second viewing area will view the first part of pixels of the second raw image at the first time, and will view the second part of pixels of the second raw image at the second time. Beyond the refresh frequency that the human eye can recognize, both the user located within the first viewing area and the user located within the second viewing area can see a complete raw image, which improves the horizontal resolution and improves the viewing clarity for the user.

The embodiments of the present disclosure have the following advantages.

With the double vision display method according to the present disclosure, the first image signal and the second image signal are reconstructed by recombining the pixels of the first raw image and the second raw image, the refresh frequencies of the display panel and the liquid crystal grating are increased, the first image signal and the second image signal are alternately input to the display panel, and appropriate light transmission position of the grating is matched, so that all the pixels of the first raw image are viewed at the first viewing area, while all the pixels of the second raw image are viewed at the second viewing area, which improves the horizontal resolution of the double vision display and improves the viewing clarity for the user.

Referring to FIG. 3, a flow diagram of a double vision display method according to another embodiment of the present disclosure is shown. This method may specifically comprise the following steps.

A step 301 includes constructing a first image signal and a second image signal of a corresponding combination of image frames that comprises a first raw image frame and a second raw image frame, wherein the first image signal comprises a signal for a first part of pixels of a first raw image and a signal for a second part of pixels of a second raw image, and the second image signal comprises a signal for a second part of pixels of the first raw image and a signal for a first part of pixels of the second raw image.

This step is in principle similar to the step 201 in the embodiment shown in FIG. 2, and will not be described in detail herein.

A step 302 includes alternately inputting the first image signal and the second image signal for each combination of image frames to the display panel.

This step is similar in principle to the step 202 in the embodiment shown in FIG. 2, and will not be described in detail herein.

A step 303 including controlling, when the first image signal is inputted to the display panel, a voltage difference between a plate-shaped electrode and each of strip electrodes of a liquid crystal grating according to the first image signal.

According to the embodiments of the present disclosure, the liquid crystal grating comprises a first substrate, a second substrate and a liquid crystal layer between the first substrate and the second substrate, a plate-shaped electrode is provided at a side of the first substrate facing the liquid crystal layer, and a plurality of strip electrodes are provided at a side of the second substrate facing the liquid crystal layer.

At a first time, the first image signal is input to the display panel, and the voltage difference between the plate-shaped electrode on the first substrate and each strip electrode on the second substrate is controlled according to the first image signal, such that the voltage difference between the plate-shaped electrode and each strip electrode is utilized to control rotations of liquid crystal molecules of the liquid crystal layer in order to form a specific arrangement.

Specifically, when the voltage difference between the plate-shaped electrode and the strip electrode is less than a set threshold, the liquid crystal molecules are in an initial state without deflection, and the light emitted from the display panel can all pass through the liquid crystal grating; and when the voltage difference between the plate-shaped electrode and the strip electrodes is greater than the set threshold, the liquid crystal molecules are deflected so that the light emitted from the display panel cannot pass through the liquid crystal grating. Alternatively, when the voltage difference between the block electrode and the strip electrode is less than the set threshold, the light emitted from the display panel cannot pass through the liquid crystal grating, and when the voltage difference between the plate-shaped electrode and the strip electrode is greater than the set threshold, the light emitted from the display panel can pass through the liquid crystal grating. Whether the grating is opaque or light transmissive when the voltage difference between the plate-shaped electrode and the strip electrode is greater than the set threshold, it is related to the arrangement of the liquid crystal molecules. The grating can be set to be opaque or light transmissive when the voltage difference is greater than the set threshold, which will not limited in the embodiments of the present disclosure.

Referring to FIG. 3a, a schematic view of a liquid crystal grating in a first state is shown.

As shown in FIG. 3a, the grating is set to be light transmissive when the voltage difference between the plate-shaped electrode and the strip electrode is greater than the set threshold. The liquid crystal grating comprises a first substrate 223, a second substrate 224 and a liquid crystal layer 227 between the first substrate 223 and the second substrate 224, a plate-shaped electrode 225 is provided at a side of the first substrate 223 facing the liquid crystal layer 227, and a plurality of strip electrodes 226 are provided at a side of the second substrate 224 facing the liquid crystal layer 227. When the voltage difference between the plate-shaped electrode and the strip electrode is less than a set threshold, the liquid crystal molecules of the liquid crystal layer 227 are in an initial state without deflection, and the light emitted from the display panel can all pass through the liquid crystal grating.

Referring to FIG. 3b, a schematic view of a liquid crystal grating in a second state is shown.

As shown in FIG. 3b, the grating is set to be opaque when the voltage difference between the plate-shaped electrode and the strip electrode is greater than the set threshold. When the voltage difference between the plate-shaped electrode 225 and the strip electrode 226 is greater than a set threshold, the liquid crystal molecules, which are located at positions corresponding to the strip electrodes 226, of the liquid crystal layer 227 are deflected so that the light emitted from the display panel cannot pass through the liquid crystal grating. The strip electrodes have a same width or different widths.

A step 304 includes switching the light transmission position of the liquid crystal grating according to the voltage difference, to form a corresponding first double vision grating state such that the first part of pixels of the first raw image is displayed towards a first viewing area and the second part of pixels of the second raw image is displayed towards a second viewing area.

According to the embodiments of the present disclosure, the voltage difference between the plate-shaped electrode and each strip electrode is utilized to control rotations of liquid crystal molecules of the liquid crystal layer in order to form a specific arrangement, so as to control a portion of the liquid crystal grating corresponding to each strip electrode to be light transmissive or opaque. By controlling the voltage difference between the plate-shaped electrode and each strip electrode, the liquid crystal grating is switched in aspect of its light transmission position to form the corresponding first double vision grating state such that the first part of pixels of the first raw image is displayed towards the first viewing area and the second part of pixels of the second raw image is displayed towards the second viewing area; as a result, a user will view the first part of pixels of the first raw image when located within the first viewing area, and will view the second part of pixels of the second raw image when located within the second viewing area.

A step 305 includes controlling, when the second image signal is inputted to the display panel, a voltage difference between the plate-shaped electrode and each of the strip electrodes according to the second image signal.

According to the embodiments of the present disclosure, the second image signal is input to the display panel at a second time, and the voltage difference between the plate-shaped electrode on the first substrate and each strip electrode on the second substrate is controlled according to the second image signal, such that the voltage difference between the block electrode and each strip electrode is utilized to control rotations of liquid crystal molecules of the liquid crystal layer in order to form a specific arrangement.

A step 306 includes switching the light transmission position of the liquid crystal grating according to the voltage difference, to form a corresponding second double vision grating state such that the second part of pixels of the first raw image is displayed towards the first viewing area and the first part of pixels of the second raw image is displayed towards the second viewing area.

According to the embodiments of the present disclosure, the voltage difference between the plate-shaped electrode and each strip electrode is utilized to control rotations of liquid crystal molecules of the liquid crystal layer in order to form a specific arrangement, so as to control a portion of the liquid crystal grating corresponding to each strip electrode to be light transmissive or opaque. By controlling the voltage difference between the plate-shaped electrode and each strip electrode, the liquid crystal grating is switched in aspect of its the light transmission position to form the corresponding second double vision grating state such that the second part of pixels of the first raw image is displayed towards the first viewing area and the first part of pixels of the second raw image is displayed towards the second viewing area; as a result, a user will view the second part of pixels of the first raw image when located within the first viewing area, and will view the first part of pixels of the second raw image when located within the second viewing area.

Refresh frequencies of the display panel and the liquid crystal grating are greater than or equal to twice an original refresh frequency.

The embodiments of the present disclosure have the following advantages.

With the double vision display method according to the present disclosure, the first image signal and the second image signal are reconstructed by recombining the pixels of the first raw image and the second raw image, the refresh frequencies of the display panel and the liquid crystal grating are increased, the first image signal and the second image signal are alternately input to the display panel, and an appropriate light transmission position of the grating is matched by controlling the voltage difference between the plate-shaped electrode and each of the strip electrodes in liquid crystal grating according to the first image signal and the second image signal, so that all the pixels of the first raw image are viewed at the first viewing area, while all the pixels of the second raw image are viewed at the second viewing area, which improves the horizontal resolution of the double vision display and improves the viewing clarity for the user.

Referring to FIG. 4, a flow diagram of a double vision display method according to yet another embodiment of the present disclosure is shown. This method may specifically comprise the following steps.

A step 401 includes constructing a first image signal and a second image signal for a combination of image frames that comprises a first raw image frame and a second raw image frame, wherein the first image signal comprises a signal for a first part of pixels of a first raw image and a signal for a second part of pixels of a second raw image, and the second image signal comprises a signal for a second part of pixels of the first raw image and a signal for a first part of pixels of the second raw image.

This step is similar in principle to the step 201 in the embodiment shown in FIG. 2, and will not be described in detail herein.

A step 402 includes alternately inputting the first image signal and the second image signal for each combination of image frames to the display panel.

This step is similar in principle to the step 202 in the embodiment shown in FIG. 2, and will not be described in detail herein.

A step 403 includes controlling, when the first image signal is inputted to the display panel, a voltage difference between a strip electrode on a first sub-substrate or the second sub-substrate and a plate-shaped electrode of the liquid crystal grating, according to the first image signal.

According to the embodiments of the present disclosure, the liquid crystal grating comprises a first substrate, a second substrate and a liquid crystal layer between the first substrate and the second substrate, a plate-shaped electrode is provided at a side of the first substrate facing the liquid crystal layer, and the second substrate comprises a first sub-substrate and a second sub-substrate arranged as upper and lower layers, the first sub-substrate and the second sub-substrate comprise the plurality of strip electrodes arranged alternately, and the first sub-substrate and the second sub-substrate are insulated from each other.

At a first time, the first image signal is input to the display panel, and the voltage difference between the strip electrode on the first sub-substrate or the second sub-substrate and the plate-shaped electrode is controlled according to the first image signal.

Figure 4A:
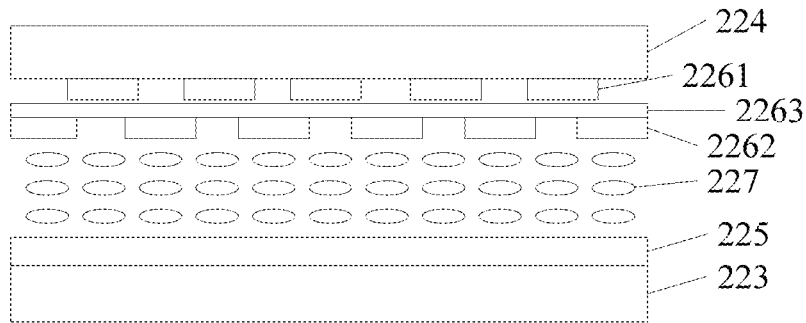
FIG. 4a is a schematic view showing a structure of a liquid crystal grating.

Referring to FIG. 4a, a schematic view of a structure of a liquid crystal grating is shown.

As shown in FIG. 4a, the liquid crystal grating comprises a first substrate 223, a second substrate 224 and a liquid crystal layer 227 between the first substrate 223 and the second substrate 224, a plate-shaped electrode 225 is provided at a side of the first substrate 223 facing the liquid crystal layer 227, a first sub-substrate and a second sub-substrate are arranged as upper and lower layers at a side of the second substrate 224 facing the liquid crystal layer 227, a plurality of strip electrodes 2261 is provided on the first sub-substrate, a plurality of strip electrodes 2262 is provided on the second sub-substrate, and an insulating layer 2263 is provided between the first sub-substrate and the second sub-substrate. Of course, in other embodiments, the strip electrodes may be arranged at two sides of the substrate in other manner.

At the first time, the first image signal is input to the display panel, and a voltage difference between the strip electrode on the first sub-substrate and the plate-shaped electrode or the voltage difference between the strip electrode on the second sub-substrate and the plate-shaped electrode is controlled according to the first image signal.

A step 404 includes switching a light transmission position of the liquid crystal grating according to the voltage difference controlled by the first image signal, to form a corresponding first double vision grating state such that the first part of pixels of the first raw image is displayed towards a first viewing area and the second part of pixels of the second raw image is displayed towards a second viewing area.

This step is similar in principle to the step 304 in the embodiment shown in FIG. 3, and will not be described in detail herein.

A step 405 includes controlling, when the second image signal is inputted to the display panel, a voltage difference between the strip electrode on the first sub-substrate or the second sub-substrate and the plate-shaped electrode according to the second image signal.

According to the embodiments of the present disclosure, at the second time, the second image signal is input to the display panel, and the voltage difference between the plate-shaped electrode and the strip electrode on the first sub-substrate or the second sub-substrate is controlled according to the second image signal.

If the voltage difference between the plate-shaped electrode and the strip electrode on the first sub-substrate is controlled at the first time, the voltage difference between the plate-shaped electrode and the strip electrode on the second sub-substrate is controlled at the second time. Alternatively, if the voltage difference between the plate-shaped electrode and the strip electrode on the second sub-substrate is controlled at the first time, the voltage difference between the plate-shaped electrode and the strip electrode on the first sub-substrate is controlled at the second time.

A step 406 includes switching the light transmission position of the liquid crystal grating according to the voltage difference, to form a corresponding second double vision grating state such that the second part of pixels of the first raw image is displayed towards the first viewing area and the first part of pixels of the second raw image is displayed towards the second viewing area.

This step is similar in principle to the step 306 in the embodiment shown in FIG. 3, and will not be described in detail herein.

Compared to the prior art, the embodiments of the present disclosure have the following advantages.

With the double vision display method according to the present disclosure, the first image signal and the second image signal are reconstructed by recombining the pixels of the first raw image and the second raw image, the refresh frequencies of the display panel and the liquid crystal grating are increased, the first image signal and the second image signal are alternately input to the display panel, and an appropriate light transmission position of the grating is matched by controlling the voltage difference between each of the strip electrodes on the first sub-substrate or the second sub-substrate and the plate-shaped electrode in liquid crystal grating according to the first image signal and the second image signal, so that all the pixels of the first raw image are viewed at the first viewing area, while all the pixels of the second raw image are viewed at the second viewing area, which improves the horizontal resolution of the double vision display and improves the viewing clarity for the user.

For the foregoing embodiments of the method, for the sake of simple description, they are all described as a series of step combinations, but those skilled in the art should understand that the embodiments of the present disclosure are not limited by the described step sequence, because some steps may be performed in other orders or simultaneously according to embodiments of the present disclosure. In addition, those skilled in the art should also understand that the embodiments described in the specification are exemplary embodiments, and the steps involved are not necessarily required by the embodiments of the present disclosure.

Figure 5:
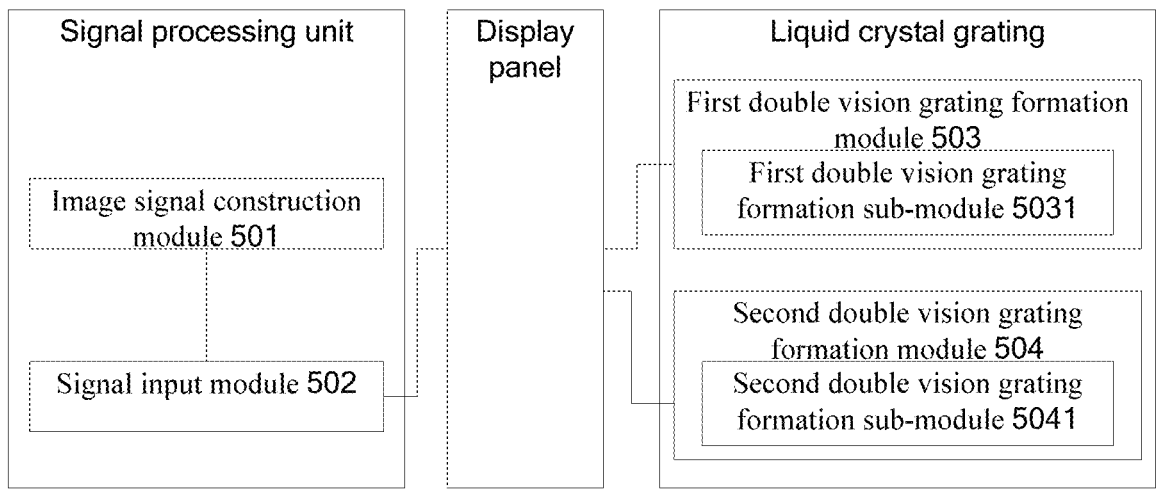
FIG. 5 shows a schematic block diagram of a double vision display device according to an embodiment of the present disclosure.

Referring to FIG. 5, a schematic block diagram of a double vision display device according to an embodiment of the present disclosure is shown. The device may specifically comprise the following modules:

an image signal construction module 501, configured for constructing a first image signal and a second image signal for a combination of image frames that comprises a first raw image frame and a second raw image frame, wherein the first image signal comprises a signal for a first part of pixels of a first raw image and a signal for a second part of pixels of a second raw image, and the second image signal comprises a signal for a second part of pixels of the first raw image and a signal for a first part of pixels of the second raw image;

a signal input module 502, configured for alternately inputting the first image signal and the second image signal for each combination of image frames to the display panel;

a first double vision grating formation module 503, configured for switching, when the first image signal is inputted to the display panel, a light transmission position of the liquid crystal grating according to the first image signal, to form a corresponding first double vision grating state such that the first part of pixels of the first raw image is displayed towards a first viewing area and the second part of pixels of the second raw image is displayed towards a second viewing area; and a second double vision grating formation module 504, configured for switching, when the second image signal is inputted to the display panel, the light transmission position of the liquid crystal grating according to the second image signal, to form a corresponding second double vision grating state such that the second part of pixels of the first raw image is displayed towards the first viewing area and the first part of pixels of the second raw image is displayed towards a second viewing area.

According to the embodiments of the present disclosure, the first part of pixels of the first raw image comprises odd-numbered columns of pixels in the first raw image; the second part of pixels of the first raw image comprises even-numbered columns of pixels in the first raw image; the first part of pixels of the second raw image comprises odd-numbered columns of pixels in the second raw image; the second part of pixels of the second raw image comprises even-numbered columns of pixels in the second raw image.

According to the embodiments of the present disclosure, the first double vision grating formation module 503 may comprise:

a first double vision grating formation sub-module 5031, configured for controlling, according to the first image signal, the first grating elements that respectively locate between the odd-numbered columns of pixels and the even-numbered columns of pixels of the display panel to be light transmissive and the second grating elements that respectively locate between the even-numbered columns of pixels and the odd-numbered columns of pixels of the display panel to be opaque, to form the corresponding first double vision grating state.

According to the embodiments of the present disclosure, the second double vision grating formation module 504 may comprise:

a second double vision grating formation sub-module 5041, configured for controlling, according to the second image signal, the second grating elements that respectively locate between the even-numbered columns of pixels and the odd-numbered columns of pixels of the display panel to be light transmissive and the first grating elements that respectively locate between the odd-numbered columns of pixels and the even-numbered columns of pixels of the display panel to be opaque, to form the corresponding second double vision grating state.

Refresh frequencies of the display panel and the liquid crystal grating are greater than or equal to twice original refresh frequencies.

Compared to the prior art, the embodiments of the present disclosure have the following advantages.

With the double vision display device according to the present disclosure, the first image signal and the second image signal are reconstructed by recombining the pixels of the first raw image and the second raw image, the refresh frequencies of the display panel and the liquid crystal grating are increased, the first image signal and the second image signal are alternately input to the display panel, and an appropriate light transmission position of the grating is matched, so that all the pixels of the first raw image are viewed at the first viewing area, while all the pixels of the second raw image are viewed at the second viewing area, which improves the horizontal resolution of the double vision display and improves the viewing clarity for the user.

Figure 6:
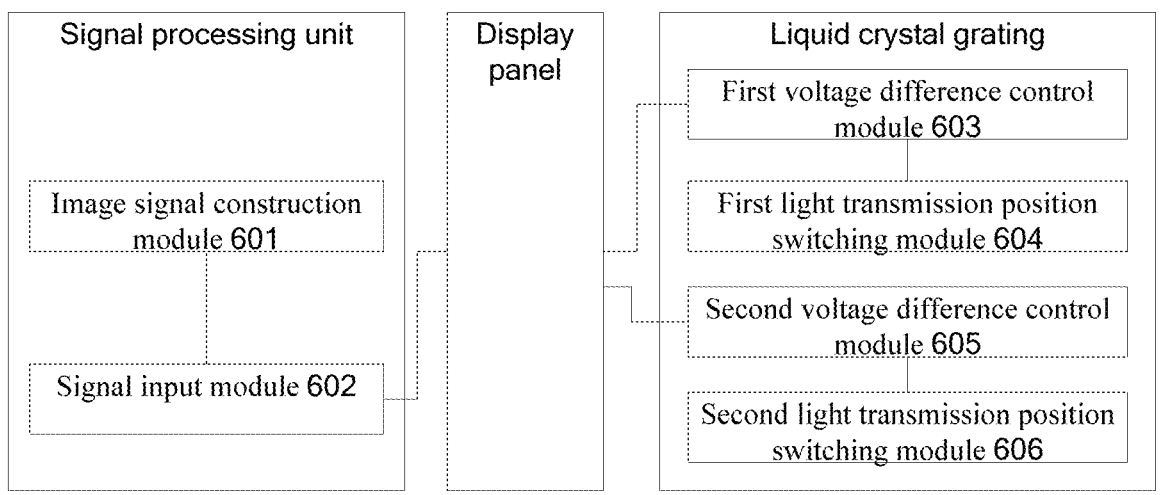
FIG. 6 shows a schematic block diagram of a double vision display device according to another embodiment of the present disclosure.

Referring to FIG. 6, a schematic block diagram of a double vision display device according to another embodiment of the present disclosure is shown.

The double vision display device may be applied in a display apparatus including a display panel and a liquid crystal grating. The liquid crystal grating comprises a first substrate, a second substrate and a liquid crystal layer between the first substrate and the second substrate, a plated shaped electrode is provided at a side of the first substrate facing the liquid crystal layer, and a plurality of strip electrodes are provided at a side of the second substrate facing the liquid crystal layer The double vision display device may specifically comprise:

an image signal construction module 601, configured for constructing a first image signal and a second image signal for a combination of image frames that comprises a first raw image frame and a second raw image frame, wherein the first image signal comprises a signal for a first part of pixels of a first raw image and a signal for a second part of pixels of a second raw image, and the second image signal comprises a signal for a second part of pixels of the first raw image and a signal for a first part of pixels of the second raw image;

a signal input module 602, configured for alternately inputting the first image signal and the second image signal for each combination of image frames to the display panel;

a first voltage difference control module 603, configured for controlling, when the first image signal is inputted to the display panel, a voltage difference between the plate-shaped electrode and each of the strip electrodes according to the first image signal;

a first light transmission position switching module 604, configured for switching the light transmission position of the liquid crystal grating according to the voltage difference controlled by the first voltage difference control module, to form the corresponding first double vision grating state such that the first part of pixels of the first raw image is displayed towards the first viewing area and the second part of pixels of the second raw image is displayed towards the second viewing area;

a second voltage difference control module 605, configured for controlling, when the second image signal is inputted to the display panel, a voltage difference between the plate-shaped electrode and each of the strip electrode according to the second image signal; and a second light transmission position switching module 606, configured for switching the light transmission position of the liquid crystal grating according to the voltage difference controlled by the second voltage difference control module, to form the corresponding second double vision grating state such that the second part of pixels of the first raw image is displayed towards the first viewing area and the first part of pixels of the second raw image is displayed towards the second viewing area.

Compared to the prior art, the embodiments of the present disclosure have the following advantages.

With the double vision display device according to the present disclosure, the first image signal and the second image signal are reconstructed by recombining the pixels of the first raw image and the second raw image, the refresh frequencies of the display panel and the liquid crystal grating are increased, the first image signal and the second image signal are alternately input to the display panel, and an appropriate light transmission position of the grating is matched by controlling the voltage difference between the plate-shaped electrode and each of the strip electrodes in liquid crystal grating according to the first image signal and the second image signal, so that all the pixels of the first raw image are viewed at the first viewing area, while all the pixels of the second raw image are viewed at the second viewing area, which improves the horizontal resolution of the double vision display and improves the viewing clarity for the user.

Figure 7:
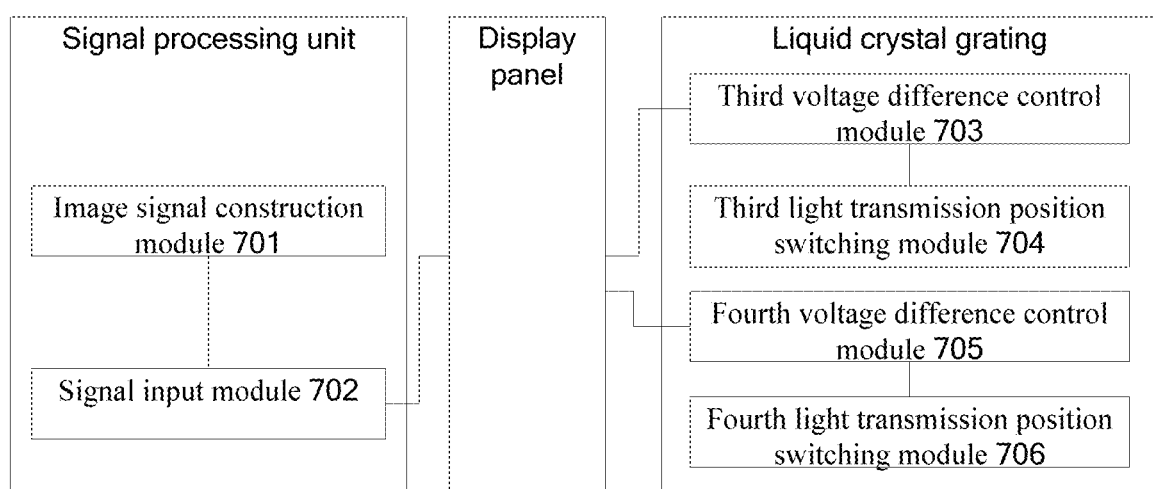
FIG. 7 shows a schematic block diagram of a double vision display device according to a yet another embodiment of the present disclosure.

Referring to FIG. 7, a schematic block diagram of a double vision display device according to a yet another embodiment of the present disclosure is shown.

The double vision display device may be applied in a display apparatus including a display panel and a liquid crystal grating. The liquid crystal grating comprises a first substrate, a second substrate and a liquid crystal layer between the first substrate and the second substrate, a plate-shaped electrode is provided at a side of the first substrate facing the liquid crystal layer, and the second substrate comprises a first sub-substrate and a second sub-substrate arranged as upper and lower layers, the first sub-substrate and the second sub-substrate comprise a plurality of strip electrodes arranged alternately, and the first sub-substrate and the second sub-substrate are insulated from each other.

The double vision display device may specifically comprise:

an image signal construction module 701, configured for constructing a first image signal and a second image signal for a combination of image frames that comprises a first raw image frame and a second raw image frame, wherein the first image signal comprises a signal for a first part of pixels of a first raw image and a signal for a second part of pixels of a second raw image, and the second image signal comprises a signal for a second part of pixels of the first raw image and a signal for a first part of pixels of the second raw image;

a signal input module 702, configured for alternately inputting the first image signal and the second image signal for each combination of image frames to the display panel;

a third voltage difference control module 703, configured for controlling, when the first image signal is inputted to the display panel, a voltage difference between the strip electrode on the first sub-substrate or the second sub-substrate and the plate-shaped electrode according to the first image signal;

a third light transmission position switching module 704, configured for switching the light transmission position of the liquid crystal grating according to the voltage difference controlled by the third voltage difference control module, to form the corresponding first double vision grating state such that the first part of pixels of the first raw image is displayed towards the first viewing area and the second part of pixels of the second raw image is displayed towards the second viewing area;

a fourth voltage difference control module 705, configured for controlling, when the second image signal is inputted to the display panel, a voltage difference between the strip electrode on the first sub-substrate or the second sub-substrate and the plate-shaped electrode according to the second image signal;

a fourth light transmission position switching module 706, configured for switching the light transmission position of the liquid crystal grating according to the voltage difference controlled by the fourth voltage difference control module, to form the corresponding second double vision grating state such that the second part of pixels of the first raw image is displayed towards the first viewing area and the first part of pixels of the second raw image is displayed towards the second viewing area.

Compared to the prior art, the embodiments of the present disclosure have the following advantages.

With the double vision display device according to the present disclosure, the first image signal and the second image signal are reconstructed by recombining the pixels of the first raw image and the second raw image, the refresh frequencies of the display panel and the liquid crystal grating are increased, the first image signal and the second image signal are alternately input to the display panel, and an appropriate light transmission position of the grating is matched by controlling the voltage difference between each of the strip electrodes in the first sub-substrate or the second sub-substrate and the plate-shaped electrode in liquid crystal grating according to the first image signal and the second image signal, so that all the pixels of the first raw image are viewed at the first viewing area, while all the pixels of the second raw image are viewed at the second viewing area, which improves the horizontal resolution of the double vision display and improves the viewing clarity for the user.

For the above-mentioned embodiments of the device, since it is basically similar to the foregoing embodiments of the method, the description is relatively simple, and the relevant parts can be referred to the description of the embodiments of the method.

In the description provided herein, numerous specific details are set forth. However, it is understood that the embodiments of the present disclosure may be practiced without these specific details. In some instances, well known methods, structures, and techniques have not been shown in detail so as not to obscure the description.

Various components according to embodiments of the present disclosure may be implemented in hardware, or in a software module running on one or more processors, or in a combination thereof. Those skilled in the art will appreciate that a microprocessor or digital signal processor (DSP) may be used in practice to implement some or all of the functionalities of some or all of the components of the double vision display device according to the embodiments of the present disclosure. The present disclosure may also be implemented as a device or device program (e.g., a computer program and a computer program product) for performing some or all of the methods described herein. Such a program implementing the present disclosure may be stored on a computer readable medium or may be in the form of one or more signals. Such signals may be downloaded from an Internet website, provided on a carrier signal, or provided in any other form.

It should be noted that the abovementioned embodiments are illustrative of the present disclosure and are not intended to limit the scope of the present disclosure, and those skilled in the art can devise alternative embodiments without departing from the scope of the appended claims.

What is claimed is:

1. A double vision display method, comprising:

constructing a first image signal and a second image signal for a combination of image frames that comprises a first raw image frame and a second raw image frame, wherein the first image signal comprises a signal for a first part of pixels of a first raw image and a signal for a second part of pixels of a second raw image, and the second image signal comprises a signal for a second part of pixels of the first raw image and a signal for a first part of pixels of the second raw image;

alternately inputting the first image signal and the second image signal for each combination of image frames to a display panel;

switching, when the first image signal is inputted to the display panel, a light transmission position of a liquid crystal grating according to the first image signal, to form a corresponding first double vision grating state such that the first part of pixels of the first raw image is displayed towards a first viewing area and the second part of pixels of the second raw image is displayed towards a second viewing area; and switching, when the second image signal is inputted to the display panel, the light transmission position of the liquid crystal grating according to the second image signal, to form a corresponding second double vision grating state such that the second part of pixels of the first raw image is displayed towards the first viewing area and the first part of pixels of the second raw image is displayed towards the second viewing area;

whereby, a user located within the first viewing area will view the first part of pixels of the first raw image at the first time, and will view the second part of pixels of the first raw image at the second time; while a user located within the second viewing area will view the first part of pixels of the second raw image at the first time, and will view the second part of pixels of the second raw image at the second time, so that beyond a refresh frequency that is recognizable by a human eye, both the user located within the first viewing area and the user located within the second viewing area can see a complete raw image.

2. The method of claim 1, wherein the liquid crystal grating comprises a first substrate, a second substrate and a liquid crystal layer between the first substrate and the second substrate, a plate-shaped electrode is provided at a side of the first substrate facing the liquid crystal layer, and a plurality of strip electrodes are provided at a side of the second substrate facing the liquid crystal layer.

3. The method of claim 2, wherein the switching, when the first image signal is inputted to the display panel, a light transmission position of a liquid crystal grating according to the first image signal, to form a corresponding first double vision grating state such that the first part of pixels of the first raw image is displayed towards a first viewing area and the second part of pixels of the second raw image is displayed towards a second viewing area, comprises:
controlling, when the first image signal is inputted to the display panel, a voltage difference between the plate-shaped electrode and each of the strip electrodes according to the first image signal; and
switching the light transmission position of the liquid crystal grating according to the voltage difference, to form the corresponding first double vision grating state such that the first part of pixels of the first raw image is displayed towards the first viewing area and the second part of pixels of the second raw image is displayed towards the second viewing area.

4. The method of claim 2, wherein the second substrate comprises a first sub-substrate and a second sub-substrate arranged as upper and lower layers, the first sub-substrate and the second sub-substrate comprise the plurality of strip electrodes arranged alternately, and the first sub-substrate and the second sub-substrate are insulated from each other.

5. The method of claim 4, wherein the switching, when the first image signal is inputted to the display panel, a light transmission position of a liquid crystal grating according to the first image signal, to form a corresponding first double vision grating state such that the first part of pixels of the first raw image is displayed towards a first viewing area and the second part of pixels of the second raw image is displayed towards a second viewing area, comprises:
controlling, when the first image signal is inputted to the display panel, a voltage difference between each of the strip electrodes on the first sub-substrate or the second sub-substrate and the plate-shaped electrode according to the first image signal; and
switching the light transmission position of the liquid crystal grating according to the voltage difference, to form the corresponding first double vision grating state such that the first part of pixels of the first raw image is displayed towards the first viewing area and the second part of pixels of the second raw image is displayed towards the second viewing area.

6. The method of claim 1, wherein:
the first part of pixels of the first raw image comprises n adjacent columns of pixels in the first raw image;
the second part of pixels of the first raw image comprises n columns of pixels adjacent to the first part of pixels in the first raw image;
the first part of pixels of the second raw image comprises n adjacent columns of pixels in the second raw image, and a column number of the first part of pixels of the second raw image is the same as that of the first part of pixels of the first raw image; and
the second part of pixels of the second raw image comprises n columns of pixels adjacent to the first part of pixels in the second raw image, and a column number of the second part of pixels of the second raw image is the same as that of the second part of pixels of the first raw image;
wherein n is a natural number equal to or greater than one.

7. The method of claim 6, wherein:
the first part of pixels of the first raw image comprises odd-numbered columns of pixels in the first raw image;
the second part of pixels of the first raw image comprises even-numbered columns of pixels in the first raw image;
the first part of pixels of the second raw image comprises odd-numbered columns of pixels in the second raw image;
the second part of pixels of the second raw image comprises even-numbered columns of pixels in the second raw image; and
the liquid crystal grating comprises first grating elements that are respectively located between the odd-numbered columns of pixels and the even-numbered columns of pixels of the display panel and second grating elements that are respectively located between the even-numbered columns of pixels and the odd-numbered columns of pixels of the display panel.

8. The method of claim 7, wherein the switching a light transmission position of a liquid crystal grating according to the first image signal, to form a corresponding first double vision grating state, comprises:
controlling, according to the first image signal, the first grating elements to be light transmissive and the second grating elements to be opaque, to form the corresponding first double vision grating state.

9. The method of claim 8, wherein the switching the light transmission position of the liquid crystal grating according to the second image signal, to form a corresponding second double vision grating state, comprises:
controlling, according to the second image signal, the second grating elements to be light transmissive and the first grating elements to be opaque, to form the corresponding second double vision grating state.

10. The method of claim 1, wherein, in the display panel, sub-pixel units of one color are only included in a same column when sub-pixel units of three different colors are arranged in a row direction, or
sub-pixel units of one color are only included in a same row when sub-pixel units of three different colors are arranged in a column direction.

11. The method of claim 10, wherein, in the display panel, the first and the second grating elements of the liquid crystal gratings have a same width, or the first grating elements of the liquid crystal gratings have a width different from the second grating elements of the liquid crystal gratings.

12. A double vision display device, comprising:
an image signal construction module, configured for constructing a first image signal and a second image signal for a combination of image frames that comprises a first raw image frame and a second raw image frame, wherein the first image signal comprises a signal for a first part of pixels of a first raw image and a signal for a second part of pixels of a second raw image, and the second image signal comprises a signal for a second part of pixels of the first raw image and a signal for a first part of pixels of the second raw image;
a signal input module, configured for alternately inputting the first image signal and the second image signal for each combination of image frames to a display panel;
a first double vision grating formation module, configured for switching, when the first image signal is inputted to the display panel, a light transmission position of a liquid crystal grating according to the first image signal, to form a corresponding first double vision grating state such that the first part of pixels of the first raw image is displayed towards a first viewing area and the second part of pixels of the second raw image is displayed towards a second viewing area; and
a second double vision grating formation module, configured for switching, when the second image signal is inputted to the display panel, the light transmission position of the liquid crystal grating according to the second image signal, to form a corresponding second double vision grating state such that the second part of pixels of the first raw image is displayed towards the first viewing area and the first part of pixels of the second raw image is displayed towards the second viewing area;

whereby, a user located within the first viewing area will view the first part of pixels of the first raw image at the first time, and will view the second part of pixels of the first raw image at the second time; while, a user located within the second viewing area will view the first part of pixels of the second raw image at the first time, and will view the second part of pixels of the second raw image at the second time, so that beyond a refresh frequency that is recognizable by a human eye, both the user located within the first viewing area and the user located within the second viewing area can see a complete raw image.

13. The device of claim 12, wherein the liquid crystal grating comprises a first substrate, a second substrate and a liquid crystal layer between the first substrate and the second substrate, a plate-shaped electrode is provided at a side of the first substrate facing the liquid crystal layer, and a plurality of strip electrodes are provided at a side of the second substrate facing the liquid crystal layer;

wherein the first double vision grating formation module comprises:
a first voltage difference control module configured for controlling, when the first image signal is inputted to the display panel, a voltage difference between the plate-shaped electrode and each of the strip electrodes according to the first image signal; and
a first light transmission position switching module configured for switching the light transmission position of the liquid crystal grating according to the voltage difference controlled by the first voltage difference control module, to form the corresponding first double vision grating state such that the first part of pixels of the first raw image is displayed towards the first viewing area and the second part of pixels of the second raw image is displayed towards the second viewing area; and wherein the second double vision grating state formation module comprises:
a second voltage difference control module configured for controlling, when the second image signal is inputted to the display panel, a voltage difference between the plate-shaped electrode and each of the strip electrodes according to the second image signal; and
a second light transmission position switching module configured for switching the light transmission position of the liquid crystal grating according to the voltage difference controlled by the second voltage difference control module, to form the corresponding second double vision grating state such that the second part of pixels of the first raw image is displayed towards the first viewing area and the first part of pixels of the second raw image is displayed towards the second viewing area.

14. The device of claim 12, wherein the liquid crystal grating comprises a first substrate, a second substrate and a liquid crystal layer between the first substrate and the second substrate, the second substrate comprises a first sub-substrate and a second sub-substrate arranged as upper and lower layers, the first sub-substrate and the second sub-substrate comprise the plurality of strip electrodes arranged alternately, and the first sub-substrate and the second sub-substrate are insulated from each other;

wherein the first double vision grating formation module comprises:
a third voltage difference control module configured for controlling, when the first image signal is inputted to the display panel, a voltage difference between each of the strip electrodes on the first sub-substrate or the second sub-substrate and the plate-shaped electrode according to the first image signal; and
a third light transmission position switching module configured for switching the light transmission position of the liquid crystal grating according to the voltage difference controlled by the third voltage difference control module, to form the corresponding first double vision grating state such that the first part of pixels of the first raw image is displayed towards the first viewing area and the second part of pixels of the second raw image is displayed towards the second viewing area; and wherein the second double vision grating formation module comprises:
a fourth voltage difference control module configured for controlling, when the second image signal is inputted to the display panel, a voltage difference between each of the strip electrodes on the second sub-substrate or the first sub-substrate and the plate-shaped electrode according to the second image signal; and
a fourth light transmission position switching module configured for switching the light transmission position of the liquid crystal grating according to the voltage difference controlled by the fourth voltage difference control module, to form the corresponding second double vision grating state such that the second part of pixels of the first raw image is displayed towards the first viewing area and the first part of pixels of the second raw image is displayed towards the second viewing area.

15. The device of claim 12, wherein:
the first part of pixels of the first raw image comprises n adjacent columns of pixels in the first raw image;
the second part of pixels of the first raw image comprises n columns of pixels adjacent to the first part of pixels in the first raw image;
the first part of pixels of the second raw image comprises n adjacent columns of pixels in the second raw image, and a column number of the first part of pixels of the second raw image is the same as that of the first part of pixels of the first raw image; and
the first part of pixels of the second raw image comprises n columns of pixels adjacent to the first part of pixels in the second raw image, and a column number of the second part of pixels of the second raw image is the same as that of the second part of pixels of the first raw image;
wherein n is a natural number equal to or greater than one.

16. The device of claim 15, wherein:
the first part of pixels of the first raw image comprises odd-numbered columns of pixels in the first raw image;
the second part of pixels of the first raw image comprises even-numbered columns of pixels in the first raw image;
the first part of pixels of the second raw image comprises odd-numbered columns of pixels in the second raw image;

the second part of pixels of the second raw image comprises even-numbered columns of pixels in the second raw image; and the liquid crystal grating comprises first grating elements that respectively locate between the odd-numbered columns of pixels and the even-numbered columns of pixels of the display panel and second grating elements that respectively locate between the even-numbered columns of pixels and the odd-numbered columns of pixels of the display panel.

17. The device of claim 16, wherein:

the first double vision grating formation module further comprises:
- a first double vision grating formation sub-module, configured for controlling, according to the first image signal, the first grating elements to be light transmissive and the second grating elements to be opaque, to form the corresponding first double vision grating state; and the second double vision grating formation module further comprises:
- a second double vision grating formation sub-module, configured for controlling, according to the second image signal, the second grating elements to be light transmissive and the first grating elements to be opaque, to form the corresponding second double vision grating state.

18. The device of claim 12, wherein, in the display panel, sub-pixel units of one color are only included in a same column when sub-pixel units of three different colors are arranged in a row direction, or sub-pixel units of one color are only included in a same row when sub-pixel units of three different colors are arranged in a column direction.

19. The device of claim 18, wherein, in the display panel, the first and the second grating elements of the liquid crystal gratings have a same width, or the first grating elements of the liquid crystal gratings have a width different from the second grating elements of the liquid crystal gratings.

* * * * *